US012395807B2

United States Patent

(12) United States Patent
Hines et al.
(10) Patent No.: US 12,395,807 B2
(45) Date of Patent: Aug. 19, 2025

(54) INSERTION OF FORCED GAPS FOR PERVASIVE LISTENING

(71) Applicant: Dolby Laboratories Licensing Corporation, San Francisco, CA (US)

(72) Inventors: Christopher Graham Hines, Sydney (AU); Benjamin John Southwell, Gledswood Hills (AU)

(73) Assignee: Dolby Laboratories Licensing Corporation, San Francisco, CA (US)

(*) Notice: Subject to any disclaimer, the term of this patent is extended or adjusted under 35 U.S.C. 154(b) by 260 days.

(21) Appl. No.: 18/254,962

(22) PCT Filed: Dec. 2, 2021

(86) PCT No.: PCT/US2021/061658
§ 371 (c)(1),
(2) Date: May 30, 2023

(87) PCT Pub. No.: WO2022/120082
PCT Pub. Date: Jun. 9, 2022

(65) Prior Publication Data

US 2024/0107252 A1 Mar. 28, 2024

Related U.S. Application Data

(60) Provisional application No. 63/201,561, filed on May 4, 2021, provisional application No. 63/120,887, filed on Dec. 3, 2020.

(51) Int. Cl.

| | |
|---|---|
| ***H04S 7/00*** | (2006.01) |
| ***H04S 3/00*** | (2006.01) |

(52) U.S. Cl.
CPC .............. *H04S 7/301* (2013.01); *H04S 3/008* (2013.01); *H04S 7/307* (2013.01); *H04S 2400/01* (2013.01); *H04S 2400/15* (2013.01)

(58) Field of Classification Search
CPC .......................... H04S 7/301; H04R 2227/005
See application file for complete search history.

(56) References Cited

U.S. PATENT DOCUMENTS 4,773,094 A 9/1988 Dolby
7,697,699 B2 4/2010 Ozawa
(Continued)

FOREIGN PATENT DOCUMENTS

EP 3351015 B1 4/2019
EP 3417544 B1 12/2019
(Continued)

OTHER PUBLICATIONS

U.S. Appl. No. 62/663,302, filed Apr. 27, 2018. Per MPEP 609.04(A), a copy of the unpublished application is not provided.

*Primary Examiner* — Ping Lee

(57) ABSTRACT

An attenuation or “gap” may be inserted into at least a first frequency range of at least first and second audio playback signals of a content stream during at least a first time interval to generate at least first and second modified audio playback signals. Corresponding audio device playback sound may be provided by at least first and second audio devices. At least one microphone may detect at least the first audio device playback sound and the second audio device playback sound and may generate corresponding microphone signals. Audio data may be extracted from the microphone signals in at least the first frequency range, to produce extracted audio data. A far-field audio environment impulse response and/or audio environment noise may be estimated based, at least in part, on the extracted audio data.

17 Claims, 24 Drawing Sheets

(56) References Cited

U.S. PATENT DOCUMENTS

| | | | |
|---|---|---|---|
| 7,711,557 | B2 | 5/2010 | Ozawa |
| 7,805,210 | B2 | 9/2010 | Cucos |
| 8,718,537 | B2 | 5/2014 | Sakata |
| 9,031,268 | B2 | 5/2015 | Fejzo |
| 9,107,023 | B2 | 8/2015 | Ninan |
| 9,208,767 | B2 | 12/2015 | Su |
| 9,472,203 | B1 | 10/2016 | Ayrapetian |
| 9,589,575 | B1 | 3/2017 | Ayrapetian |
| 9,769,587 | B2 | 9/2017 | Schevciw |
| 10,070,244 | B1 | 9/2018 | Dabney |
| 10,524,053 | B1 | 12/2019 | Moore |
| 10,681,463 | B1 | 6/2020 | Beckhardt |
| 2013/0058492 | A1 | 3/2013 | Silzle |
| 2013/0279707 | A1 | 10/2013 | Tagaeto |
| 2017/0041726 | A1 | 2/2017 | Jarvis |
| 2019/0237091 | A1 | 8/2019 | Jones |
| 2020/0042285 | A1 | 2/2020 | Choi |
| 2020/0107116 | A1 | 4/2020 | Frank |

FOREIGN PATENT DOCUMENTS

| | | | |
|---|---|---|---|
| WO | 2019209973 | A1 | 10/2019 |
| WO | 2019229746 | A1 | 12/2019 |
| WO | 2020023856 | W | 1/2020 |

INSERTION OF FORCED GAPS FOR PERVASIVE LISTENING

CROSS REFERENCE TO RELATED APPLICATIONS

This application is a U.S. National Stage application under U.S.C. 371 of International Application No. PCT/US2021/061658, filed Dec. 2, 2021, which claims priority to U.S. Provisional Application No. 63/201,561, filed May 4, 2021, and U.S. Provisional Application No. 63/120,887, filed Dec. 3, 2020, all of which are incorporated herein by reference in their entirety.

TECHNICAL FIELD

This disclosure pertains to audio processing systems and methods.

BACKGROUND

Audio devices and systems are widely deployed. Although existing systems and methods for estimating audio environment impulse responses and audio environment noise can provide satisfactory results in some contexts, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods. In some instances, the method(s) may be implemented, at least in part, by a control system and/or via instructions (e.g., software) stored on one or more non-transitory media. Some methods may involve causing, by a control system, a first gap to be inserted into a first frequency range of first audio playback signals of a content stream during a first time interval of the content stream, to generate first modified audio playback signals for a first audio device of an audio environment. The first gap may be, or may cause, an attenuation of the first audio playback signals in the first frequency range.

Some such methods may involve causing, by the control system, the first audio device to play back the first modified audio playback signals, to generate first audio device playback sound. Some such methods may involve causing, by the control system, the first gap to be inserted into the first frequency range of second audio playback signals of the content stream during the first time interval of the content stream, to generate second modified audio playback signals for a second audio device of the audio environment. Some such methods may involve causing, by the control system, the second audio device to play back the second modified audio playback signals, to generate second audio device playback sound.

Some such methods may involve causing, by the control system, at least one microphone of the audio environment to detect at least the first audio device playback sound and the second audio device playback sound and to generate microphone signals corresponding to at least the first audio device playback sound and the second audio device playback sound. Some such methods may involve extracting, by the control system, audio data from the microphone signals in at least the first frequency range, to produce extracted audio data. Some such methods may involve estimating, by the control system, at least one of a far-field audio environment impulse response or audio environment noise based, at least in part, on the extracted audio data.

Some such methods also may involve causing a target audio device to play back unmodified audio playback signals of the content stream, to generate target audio device playback sound. Some such methods also may involve estimating, by the control system, at least one of a target audio device audibility or a target audio device position based, at least in part, on the extracted audio data. In some such examples, the unmodified audio playback signals do not include the first gap. In some such examples, the unmodified audio playback signals may not include a gap inserted into any frequency range. According to some such examples, the microphone signals may also correspond to the target audio device playback sound.

According to some examples, generating the first modified audio playback signals may involve causing, by the control system, second through $N^{th}$ gaps to be inserted into second through $N^{th}$ frequency ranges of the first audio playback signals during second through $N^{th}$ time intervals of the content stream, where N is an integer greater than two. In some such examples, generating the second modified audio playback signals may involve causing, by the control system, the second through $N^{th}$ gaps to be inserted into the second through $N^{th}$ frequency ranges of the second audio playback signals during the second through $N^{th}$ time intervals of the content stream.

Some methods may involve causing, by the control system, the first gap to be inserted into the first frequency range of third through $M^{th}$ audio playback signals of the content stream during the first time interval of the content stream to generate third through $M^{th}$ modified audio playback signals for third through $M^{th}$ audio devices of the audio environment, where M is an integer greater than three. Some such methods may involve causing, by the control system, the third through $M^{th}$ audio devices to play back corresponding instances of third through $M^{th}$ modified audio playback signals, to generate third through $M^{th}$ audio device playback sound. In some such examples, generating the microphone signals may involve causing, by the control system, the at least one microphone of the audio environment to detect the third through $M^{th}$ audio device playback sound. In some such examples, generating first through $M^{th}$ modified audio playback signals may involve causing, by the control system, second through $N^{th}$ gaps to be inserted into second through $N^{th}$ frequency ranges of the first through $M^{th}$ audio playback signals during second through $N^{th}$ time intervals of the content stream.

In some examples, at least the first gap may be perceptually masked. According to some examples, causing the first gap to be inserted may involve transmitting instructions to insert the first gap. In other examples, causing the first gap to be inserted may involve inserting the first gap.

In some examples, at least the first frequency range may correspond to a frequency band. In some such examples, the frequency band may be one of a plurality of frequency bands that are equally spaced on a mel scale. However, in some instances at least the first frequency range may correspond to a frequency bin.

According to some examples, causing the first audio device to play back the first modified audio playback signals may involve transmitting instructions to the first audio device to play back the first modified audio playback signals. In some examples, the first modified audio playback signals and the second modified audio playback signals may be at least partially correlated.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus. For example, one or more devices may be configured for performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1A:
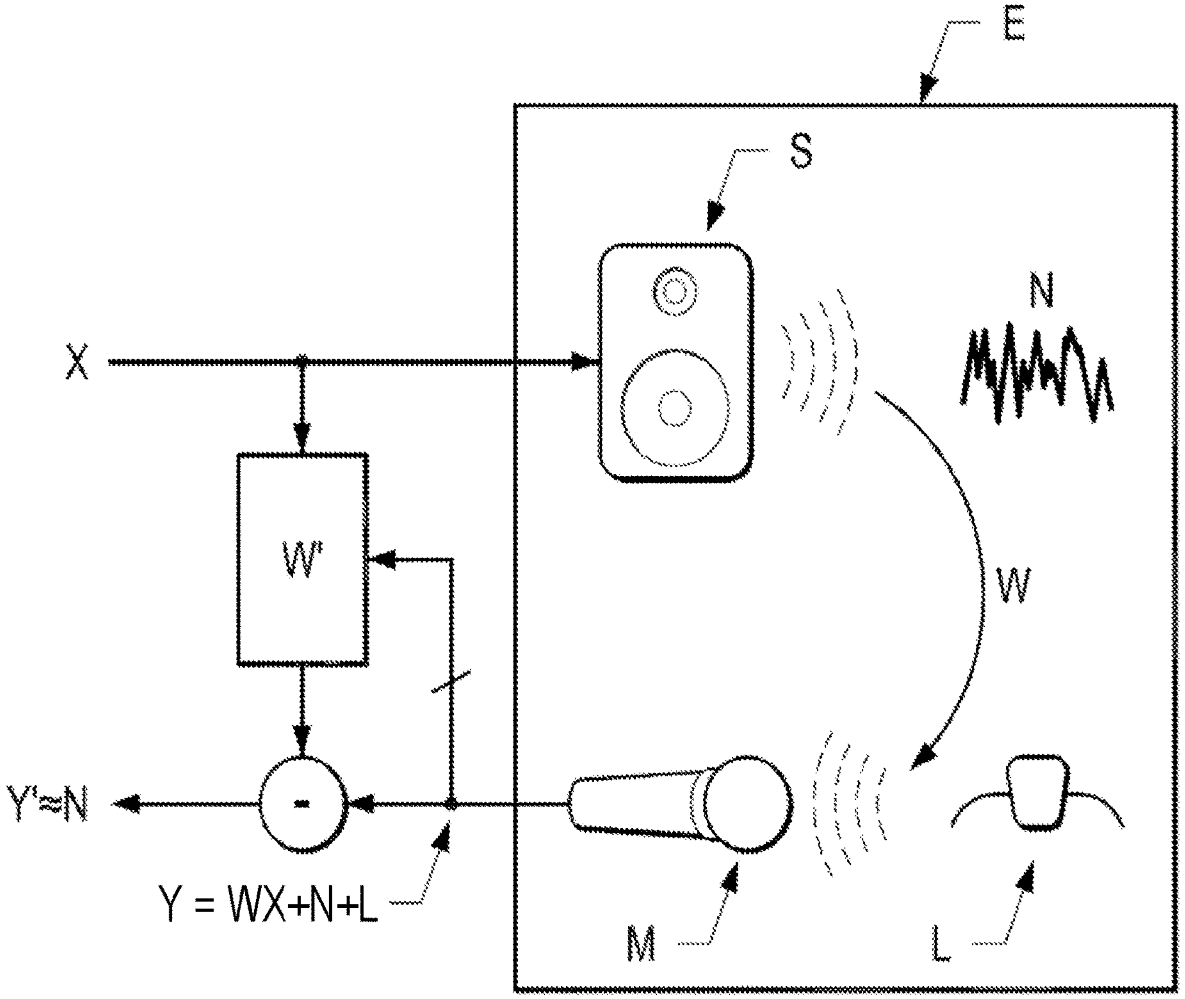
FIG. 1A shows an example of a system for estimating background noise in an audio environment.

To achieve compelling spatial playback of media and entertainment content the physical layout and relative capabilities of the available speakers should be evaluated and taken into account. Similarly, in order to provide high-quality voice-driven interactions (with both virtual assistants and remote talkers) users need both to be heard and to hear the conversation as reproduced via loudspeakers. It is anticipated that as more co-operative devices are added to an audio environment, the combined utility to the user will increase, as devices will be within convenient voice range more commonly. A larger number of speakers allows for greater immersion as the spatiality of the media presentation may be leveraged.

Sufficient co-ordination and co-operation between devices could potentially allow these opportunities and experiences to be realized. Acoustic information about each audio device is a key component of such co-ordination and co-operation. Such acoustic information may include the audibility of each loudspeakers from various positions in the audio environment, as well as the amount of noise in the audio environment.

Some previous methods of mapping and calibrating a constellation of smart audio devices require a dedicated calibration procedure, whereby known stimulus is played from the audio devices (often one audio device playing at a time) while one or more microphones records. Though this process can be made appealing to a select demographic of users through creative sound design, the need to repeatedly re-perform the process as devices are added, removed or even simply relocated presents a barrier to widespread adoption. Imposing such a procedure on users will interfere with the normal operation of the devices and may frustrate some users. An even more rudimentary approach that is also popular is manual user intervention via a software application ("app") and/or a guided process in which users indicate the physical location of audio devices in an audio environment. Such approaches present further barriers to user adoption and may provide relatively less information to the system than a dedicated calibration procedure.

Calibration and mapping algorithms generally require some basic acoustic information for each audio device in an audio environment. Many such methods have been proposed, using a range of different basic acoustic measurements and acoustic properties being measured. Examples of acoustic properties derived from microphone signals for use in such algorithms include:

Estimates of physical distance between devices (acoustic ranging);

Estimates of angle between devices (direction of arrival (DoA));

Estimates of impulse responses between devices (e.g., through swept sine wave stimulus or other measurement signals); and Estimates of background noise.

However, existing calibration and mapping algorithms are not generally implemented so as to be responsive to changes in the acoustic scene of an audio environment such as the movement of people within the audio environment, the repositioning of audio devices within the audio environment, etc.

It has been proposed to address the problem of estimating background noise from a microphone output signal (indicative of both background noise and playback content) by attempting to correlate the playback content with the microphone output signal and subtracting an estimate of the playback content captured by the microphone (referred to as the "echo") from the microphone output. The content of a microphone output signal generated as the microphone captures sound, indicative of playback content X emitted from speaker(s) and background noise N, can be denoted as WX+N, where W is a transfer function determined by the speaker(s) which emit the sound indicative of playback content, the microphone, and the environment (e.g., room) in which the sound propagates from the speaker(s) to the microphone. For example, in an academically proposed method (to be described with reference to FIG. 1A) for estimating the noise N, a linear filter W' is adapted to facilitate an estimate, W'X, of the echo (playback content captured by the microphone), WX, for subtraction from the microphone output signal. Even if nonlinearities are present in the system, a nonlinear implementation of filter W' is rarely implemented due to computational cost.

FIG. 1A shows an example of a system for estimating background noise in an audio environment. In this example, FIG. 1A is a diagram of a system for implementing the above-mentioned conventional method (sometimes referred to as echo cancellation) for estimating background noise in an audio environment in which speaker(s) emit sound indicative of playback content. A playback signal X is presented to a speaker system S (e.g., a single speaker) in audio environment E. Microphone M is located in the same audio environment E. In response to playback signal X, speaker system S emits sound which arrives, with environmental noise N and user speech L, at microphone M. The microphone output signal is Y=WX+N+L, where W denotes a transfer function which is the combined response of the speaker system S, playback environment E, and microphone M.

The general method implemented by the FIG. 1A system is to adaptively infer the transfer function W from Y and X, using any of various adaptive filter methods. As indicated in FIG. 1A, linear filter W' is adaptively determined to be an approximation of transfer function W.' The playback signal content (the "echo") indicated by microphone signal M is estimated as W'X, and W'X is subtracted from Y to yield an estimate, Y'=WX−W'X+N+L, of the noise N and the user speech L. Of interest to noise compensation applications, adjusting the level of X in proportion to Y' produces a feedback loop if a positive bias exists in the estimation. An increase in Y' in turn increases the level of X, which introduces an upward bias in the estimate (Y') of N and L, which in turn increases the level of X and so on. A solution in this form would rely heavily on the ability of the adaptive filter W' to cause subtraction of W'X from Y to remove a significant amount of the echo WX from the microphone signal M.

Further filtering of the signal Y' is usually required in order to keep the FIG. 1A system stable. As most noise compensation embodiments in the field exhibit lackluster performance, it is likely that most solutions typically bias noise estimates downward and introduce aggressive time smoothing in order to keep the system stable. This comes at the cost of reduced and very slow acting compensation.

Conventional implementations of systems (of the type described with reference to FIG. 1A) which are claimed to implement the above-mentioned academic method for noise estimation usually ignore issues that come with the implemented process, including some or all of the following:

despite academic simulations of solutions indicating upwards of 40 dB of echo reduction, real implementations generally achieve far less than 40 dB of echo reduction due to non-linearities, the presence of background noise, and the non-stationarity of the echo path W. This means that any measurements of background noise will be biased by the residual echo;

there are times when environmental noise and particular playback content cause "leakage" in such systems (e.g., when playback content excites the non-linear region of the playback system, due to buzz, rattle, and distortion). In these instances the microphone output signal contains a significant amount of residual echo which will be incorrectly interpreted as background noise. In such instances, the adaption of filter W' can also become unstable, as the residual error signal becomes large. Also, when the microphone signal is compromised by a high level of noise, adaption of filter W' can become unstable; and the computational complexity required for generating a noise estimate (Y') useful for performing noise compensated media playback (NCMP) operating over a wide frequency range (e.g., one that covers the playback of typical music) is high.

Noise compensation (e.g., automatically levelling of speaker playback content) to compensate for environmental noise conditions is a well-known and desired feature, but has not previously been implemented in an optimal manner. Using a microphone to measure environmental noise conditions also measures the speaker playback content presenting a major challenge for noise estimation (e.g., online noise estimation) needed to implement noise compensation.

Because people in an audio environment may commonly be outside the critical acoustic distance of any given room, echo introduced from other devices from a similar distance away may still represent a significant echo impact. Even if sophisticated multi-channel echo cancellation is available, and somehow achieves the performance required, the logistics of providing the canceller with remote echo references can have unacceptable bandwidth and complexity costs.

Some disclosed implementations provide methods of continuously calibrating a constellation of audio devices in an audio environment, via persistent (e.g., continuous or at least ongoing) characterization of the acoustic space including people, devices and audio conditions (such as noise and/or echoes). In some disclosed examples, such processes continue even whilst media is being played back via audio devices of the audio environment.

As used herein, a "gap" in a playback signal denotes a time (or time interval) of the playback signal at (or in) which playback content is missing (or has a level less than a predetermined threshold). For example, a "gap" may be an attenuation of playback content in a frequency range, during a time interval. In some disclosed implementations, gaps may be inserted in one or more frequency ranges of audio playback signals of a content stream to produce modified audio playback signals and the modified audio playback signals may be reproduced or "played back" in the audio environment. In some such implementations, N gaps may be inserted into N frequency ranges of the audio playback signals during N time intervals.

According to some such implementations, M audio devices may orchestrate their gaps in time and frequency, thereby allowing an accurate detection of the far-field (respective to each device) in the gap frequencies and time intervals. These "orchestrated gaps" are an important aspect of the present disclosure. In some examples, M may be a number corresponding to all audio devices of an audio environment. In some instances, M may be a number corresponding to all audio devices of the audio environment except a target audio device, which is an audio device whose played-back audio is sampled by one or more microphones of the M orchestrated devices of the audio environment (e.g., one or more microphones of the M orchestrated audio devices of the audio environment), e.g., to evaluate the relative audibility, position, non-linearities, and/or other characteristics of the target audio device. In some examples, a target audio device may reproduce unmodified audio playback signals that do not include a gap inserted into any frequency range. In other examples, M may be a number corresponding to a subset of the audio devices of an audio environment, e.g., multiple participating non-target audio devices.

It is desirable that the orchestrated gaps should have a low perceptual impact (e.g., a negligible perceptual impact) to listeners in the audio environment. Therefore, in some examples gap parameters may be selected to minimize perceptual impact.

In some examples, while the modified audio playback signals are being played back in the audio environment, a target device may reproduce unmodified audio playback signals that do not include a gap inserted into any frequency range. In such examples, the relative audibility and/or position of the target device may be estimated from the perspective of the M audio devices that are reproducing the modified audio playback signals.

Figure 1B:
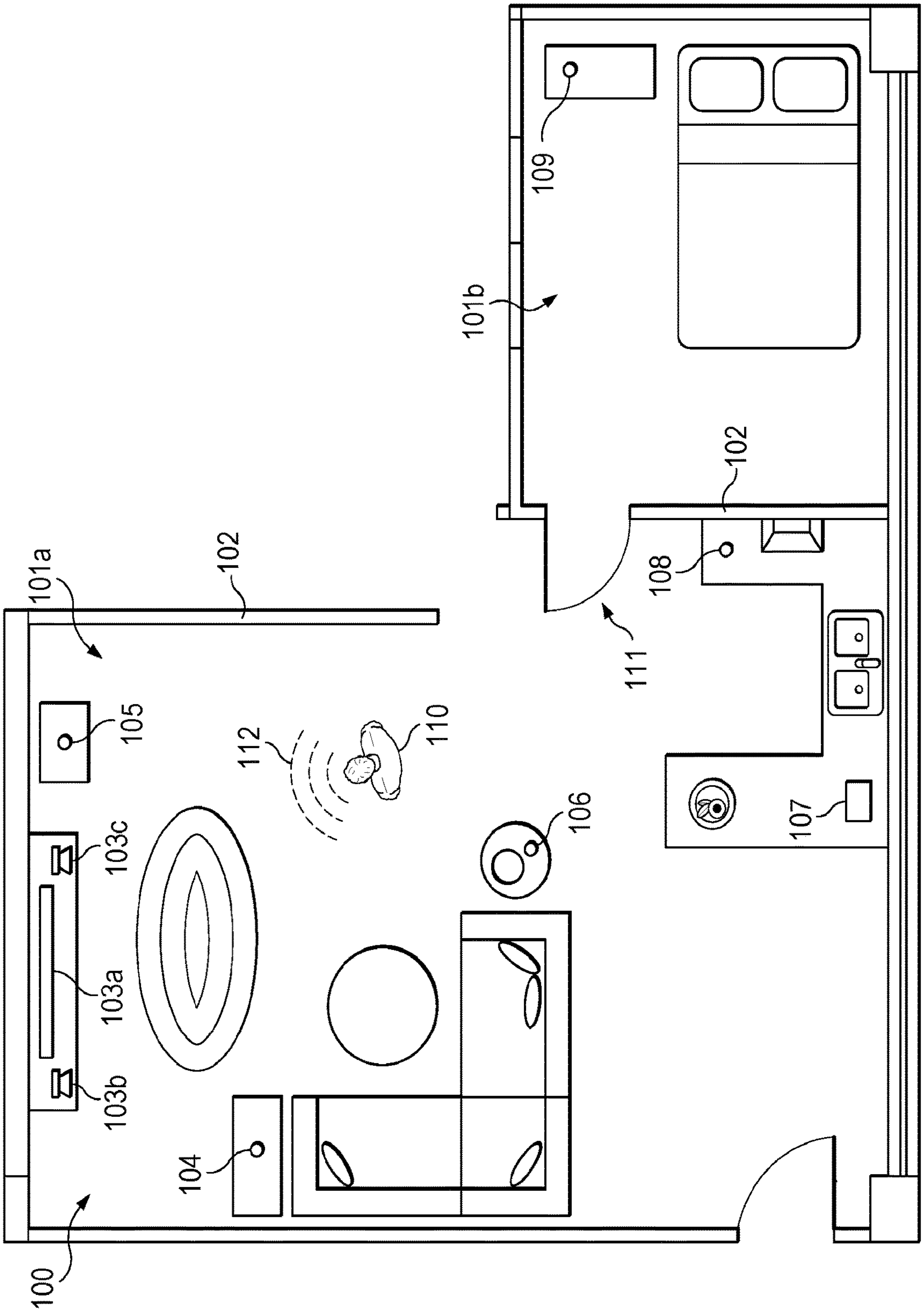
FIG. 1B shows an example of an audio environment.

FIG. 1B shows an example of an audio environment. As with other figures provided herein, the types and numbers of elements shown in FIG. 1B are merely provided by way of example. Other implementations may include more, fewer and/or different types and numbers of elements.

According to this example, the audio environment 100 includes a main living space 101*a* and a room 101*b* that is adjacent to the main living space 101*a*. Here, a wall 102 and a door 111 separates the main living space 101*a* from the room 101*b*. In this example, the amount of acoustic separation between the main living space 101*a* and the room 101*b* depends on whether the door 111 is open or closed, and if open, the degree to which the door 11 is open.

At the time corresponding to FIG. 1B, a smart television (TV) 103*a* is located within the audio environment 100. According to this example, the smart TV 103*a* includes a left loudspeaker 103*b* and a right loudspeaker 103*c*.

In this example, smart audio devices 104, 105, 106, 107, 108 and 109 are also located within the audio environment 100 at the time corresponding to FIG. 1B. According to this example, each of the smart audio devices 104-109 includes at least one microphone and at least one loudspeaker. However, in this instance the smart audio devices 104-109 include loudspeakers of various sizes and having various capabilities.

According to this example, at least one acoustic event is occurring in the audio environment 100. In this example, one acoustic event is caused by the talking person 110, who is uttering a voice command 112.

In this example, another acoustic event is caused, at least in part, by the variable element 103. Here, the variable element 103 is a door of the audio environment 100. According to this example, as the door 103 opens, sounds 105 from outside the environment may be perceived more clearly inside the audio environment 100. Moreover, the changing angle of the door 103 changes some of the echo paths within the audio environment 100. According to this example, element 104 represents a variable element of the impulse response of the audio environment 100 caused by varying positions of the door 103.

Figure 1C:
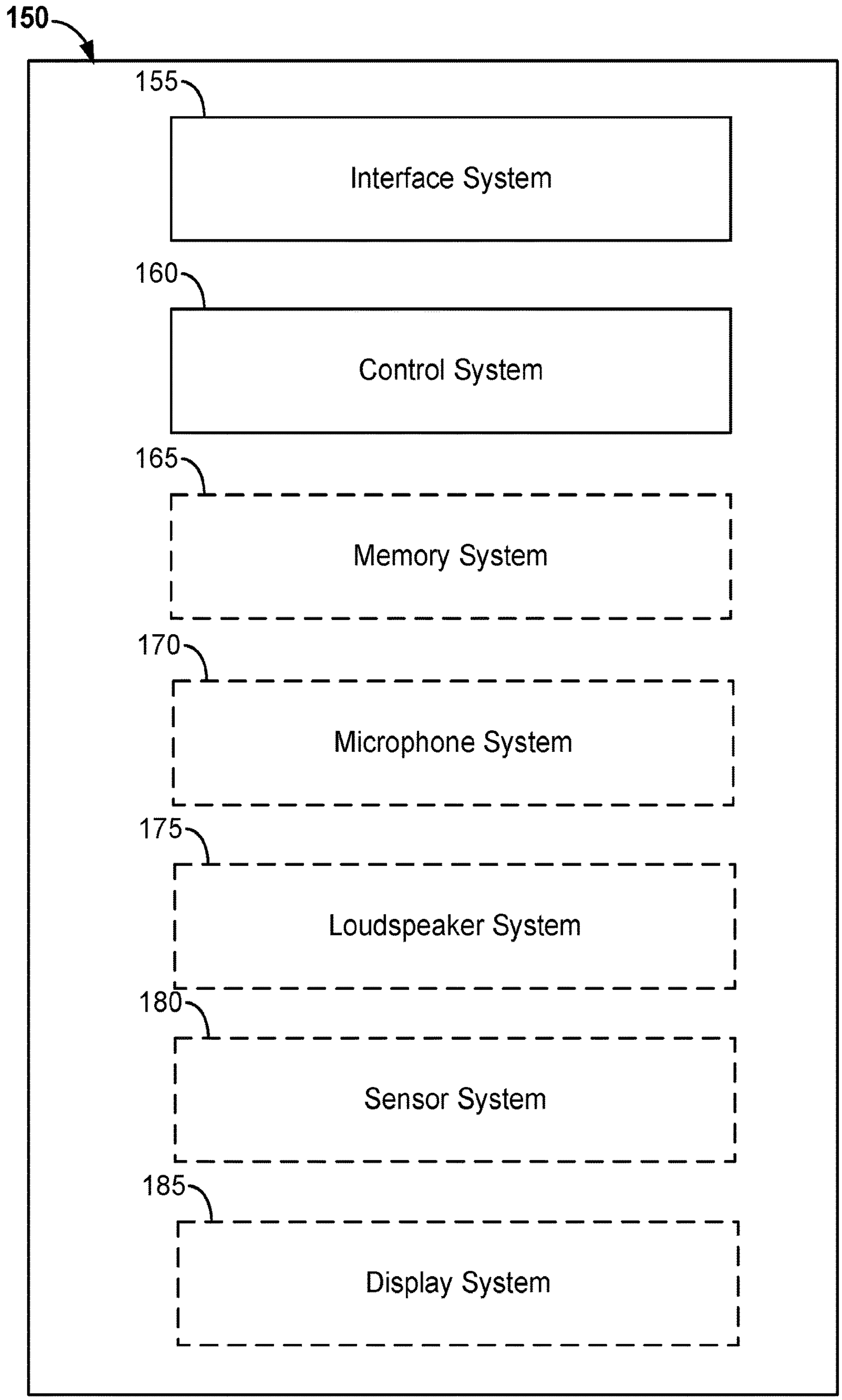
FIG. 1C is a block diagram that shows examples of components of an apparatus capable of implementing various aspects of this disclosure.

FIG. 1C is a block diagram that shows examples of components of an apparatus capable of implementing various aspects of this disclosure. As with other figures provided herein, the types and numbers of elements shown in FIG. 1C are merely provided by way of example. Other implementations may include more, fewer and/or different types and numbers of elements. According to some examples, the apparatus 150 may be configured for performing at least some of the methods disclosed herein. In some implementations, the apparatus 150 may be, or may include, one or more components of an audio system. For example, the apparatus 150 may be an audio device, such as a smart audio device, in some implementations. In the example shown in FIG. 1B, the smart TV 103*a* and the smart audio devices 104-109 are instances of the apparatus 150. According to some examples, the audio environment 100 of FIG. 1B may include an orchestrating device, such as what may be referred to herein as a smart home hub. The smart home hub (or other orchestrating device) may be an instance of the apparatus 150. In other examples, the examples, the apparatus 150 may be a mobile device (such as a cellular telephone), a laptop computer, a tablet device, a television or another type of device.

According to some alternative implementations the apparatus 150 may be, or may include, a server. In some such examples, the apparatus 150 may be, or may include, an encoder. Accordingly, in some instances the apparatus 150 may be a device that is configured for use within an audio environment, such as a home audio environment, whereas in other instances the apparatus 150 may be a device that is configured for use in "the cloud," e.g., a server.

In this example, the apparatus 150 includes an interface system 155 and a control system 160. The interface system 155 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 155 may, in some implementations, be configured for exchanging control information and associated data with audio devices of the audio environment. The control information and associated data may, in some examples, pertain to one or more software applications that the apparatus 150 is executing.

The interface system 155 may, in some implementations, be configured for receiving, or for providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 155 may include one or more network interfaces and/or one or more external device interfaces (such as one or more universal serial bus (USB) interfaces). According to some implementations, the interface system 155 may include one or more wireless interfaces. The interface system 155 may include one or more devices for implementing a user interface, such as one or more microphones, one or more speakers, a display system, a touch sensor system and/or a gesture sensor system. In some examples, the interface system 155 may include one or more interfaces between the control system 160 and a memory system, such as the optional memory system 165 shown in FIG. 1C. However, the control system 160 may include a memory system in some instances. The interface system 155 may, in some implementations, be configured for receiving input from one or more microphones in an environment.

In some implementations, the control system 160 may be configured for performing, at least in part, the methods disclosed herein. The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 155 also may, in some examples, reside in more than one device.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 165 shown in FIG. 1C and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 1C.

In some examples, the apparatus 150 may include the optional microphone system 170 shown in FIG. 1C. The optional microphone system 170 may include one or more microphones. According to some examples, the optional microphone system 170 may include an array of microphones. The array of microphones may, in some instances, be configured for receive-side beamforming, e.g., according to instructions from the control system 160. In some examples, the array of microphones may be configured to determine direction of arrival (DoA) and/or time of arrival (ToA) information, e.g., according to instructions from the control system 160. Alternatively, or additionally, the control system 160 may be configured to determine direction of arrival (DoA) and/or time of arrival (ToA) information, e.g., according to microphone signals received from the microphone system 170.

In some implementations, one or more of the microphones may be part of, or associated with, another device, such as a speaker of the speaker system, a smart audio device, etc. In some examples, the apparatus 150 may not include a microphone system 170. However, in some such implementations the apparatus 150 may nonetheless be configured to receive microphone data for one or more microphones in an audio environment via the interface system 160. In some such implementations, a cloud-based implementation of the apparatus 150 may be configured to receive microphone data, or data corresponding to the microphone data, from one or more microphones in an audio environment via the interface system 160.

According to some implementations, the apparatus 150 may include the optional loudspeaker system 175 shown in FIG. 1C. The optional loudspeaker system 175 may include one or more loudspeakers, which also may be referred to herein as "speakers" or, more generally, as "audio reproduction transducers." In some examples (e.g., cloud-based implementations), the apparatus 150 may not include a loudspeaker system 175.

In some implementations, the apparatus 150 may include the optional sensor system 180 shown in FIG. 1C. The optional sensor system 180 may include one or more touch sensors, gesture sensors, motion detectors, etc. According to some implementations, the optional sensor system 180 may include one or more cameras. In some implementations, the cameras may be free-standing cameras. In some examples, one or more cameras of the optional sensor system 180 may reside in a smart audio device, which may be a single purpose audio device or a virtual assistant. In some such examples, one or more cameras of the optional sensor system 180 may reside in a television, a mobile phone or a smart speaker. In some examples, the apparatus 150 may not include a sensor system 180. However, in some such implementations the apparatus 150 may nonetheless be configured to receive sensor data for one or more sensors in an audio environment via the interface system 160.

In some implementations, the apparatus 150 may include the optional display system 185 shown in FIG. 1C. The optional display system 185 may include one or more displays; such as one or more light-emitting diode (LED) displays. In some instances, the optional display system 185 may include one or more organic light-emitting diode (OLED) displays. In some examples, the optional display system 185 may include one or more displays of a smart audio device. In other examples, the optional display system 185 may include a television display, a laptop display, a mobile device display, or another type of display. In some examples wherein the apparatus 150 includes the display system 185, the sensor system 180 may include a touch sensor system and/or a gesture sensor system proximate one or more displays of the display system 185. According to some such implementations, the control system 160 may be configured for controlling the display system 185 to present one or more graphical user interfaces (GUIs).

According to some such examples the apparatus 150 may be, or may include, a smart audio device. In some such implementations the apparatus 150 may be, or may include, a wakeword detector. For example, the apparatus 150 may be, or may include, a virtual assistant.

As noted above, in some implementations one or more "gaps" (also referred to herein as "forced gaps" or "parameterized forced gaps") may be inserted in one or more frequency ranges of audio playback signals of a content stream to produce modified audio playback signals. The modified audio playback signals may be reproduced or "played back" in the audio environment. In some such implementations, N gaps may be inserted into N frequency ranges of the audio playback signals during N time intervals. According to some such implementations, M audio devices may orchestrate their gaps in time and frequency, thereby allowing an accurate detection of the far-field (respective to each device) in the gap frequencies and time intervals.

Figure 2A:
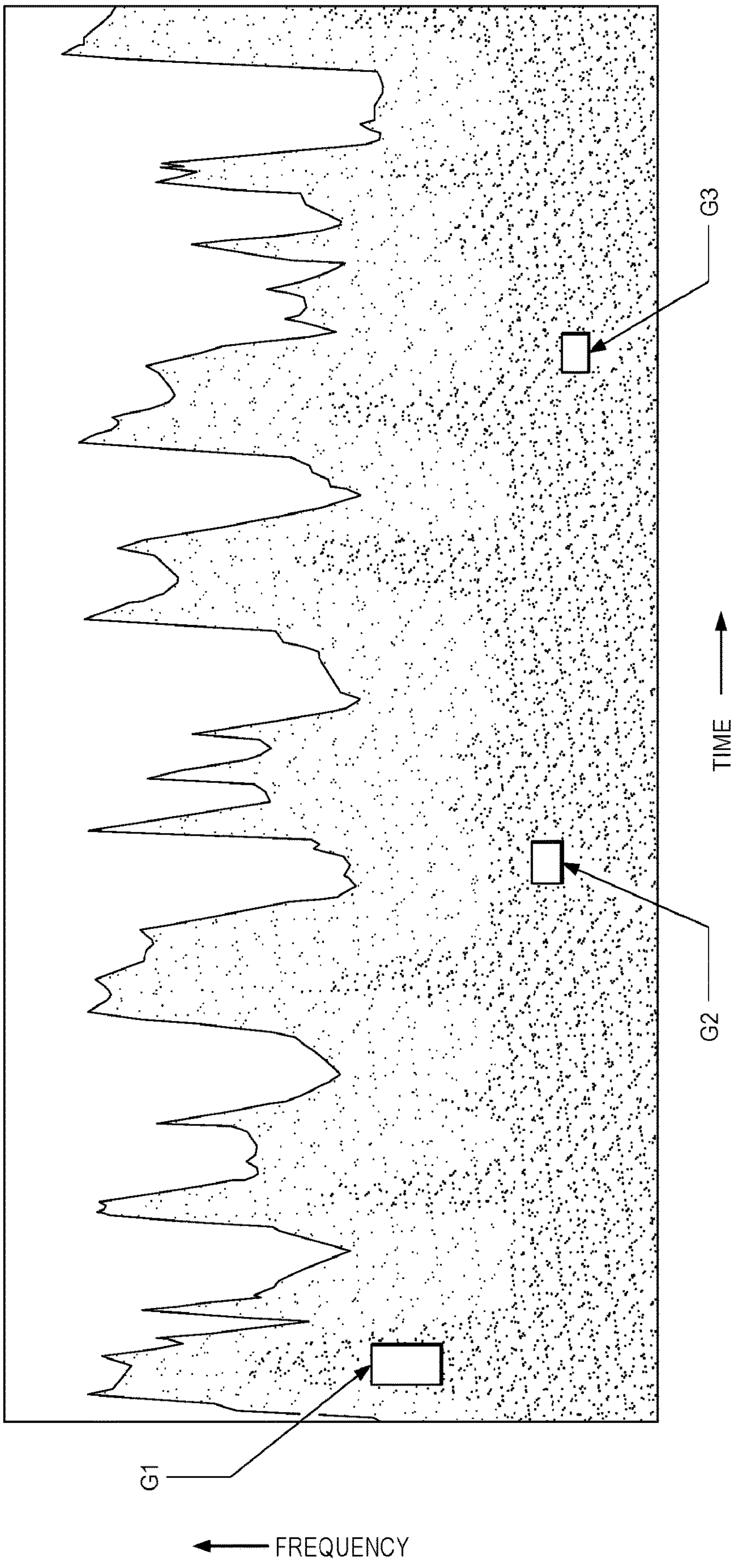
FIG. 2A is an example of a spectrogram of modified audio playback signal.

In some examples, a sequence of forced gaps is inserted in a playback signal, each forced gap in a different frequency band (or set of bands) of the playback signal, to allow a pervasive listener to monitor non-playback sound which occurs "in" each forced gap in the sense that it occurs during the time interval in which the gap occurs and in the frequency band(s) in which the gap is inserted. FIG. 2A is an example of a spectrogram of modified audio playback signal. In this example, the modified audio playback signal was created by inserting gaps into an audio playback signal according to one example. More specifically, to generate the spectrogram of FIG. 2A, a disclosed method was performed on an audio playback signal to introduce forced gaps (e.g., gaps G1, G2, and G3 shown in FIG. 2A) in frequency bands thereof, thereby generating the modified audio playback signal. In the spectrogram shown in FIG. 2A, position along the horizontal axis indicates time and position along the vertical axis indicates frequency of the content of the modified audio playback signal at an instant of time. The density of dots in each small region (each such region centered at a point having a vertical and horizontal coordinate in this example) indicates energy of the content of the modified audio playback signal at the corresponding frequency and instant of time: denser regions indicate content having greater energy and less dense regions indicate content having lower energy. Thus, the gap G1 occurs at a time (in other words, during a time interval) earlier than the time at which (in other words, during a time interval in which) gap G2 or G3 occurs, and gap G1 has been inserted in a higher frequency band than the frequency band in which gap G2 or G3 has been inserted.

Introduction of a forced gap into a playback signal in accordance some disclosed methods is distinct from simplex device operation in which a device pauses a playback stream of content (e.g., in order to better hear the user and the user's environment). Introduction of forced gaps into a playback signal in accordance with some disclosed methods may be optimized to significantly reduce (or eliminate) the perceptibility of artifacts resulting from the introduced gaps during playback, preferably so that the forced gaps have no or minimal perceptible impact for the user, but so that the output signal of a microphone in the playback environment is indicative of the forced gaps (e.g., so the gaps can be exploited to implement a pervasive listening method). By using forced gaps which have been introduced in accordance with some disclosed methods, a pervasive listening system may monitor non-playback sound (e.g., sound indicative of background activity and/or noise in the playback environment) even without the use of an acoustic echo canceller.

Figure 2B:
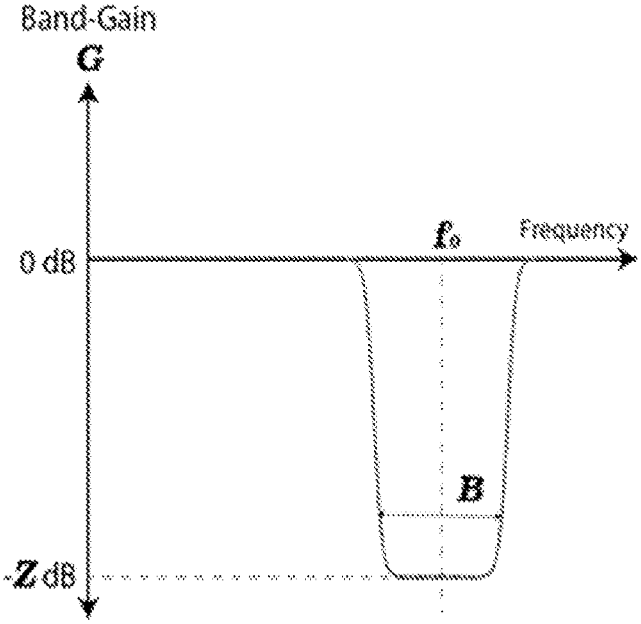
FIG. 2B is a graph that shows an example of a gap in the frequency domain.
Figure 2C:
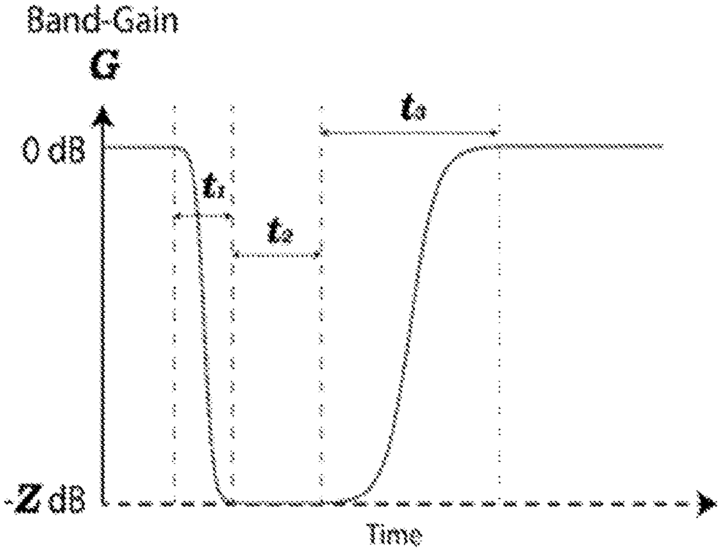
FIG. 2C is a graph that shows an example of a gap in the time domain.

With reference to FIGS. 2B and 2C, we next describe an example of a parameterized forced gap which may be inserted in a frequency band of an audio playback signal, and criteria for selection of the parameters of such a forced gap. FIG. 2B is a graph that shows an example of a gap in the frequency domain. FIG. 2C is a graph that shows an example of a gap in the time domain. In these examples, the parameterized forced gap is an attenuation of playback content using a band attenuation, G, whose profiles over both time and frequency resemble the profiles shown in FIGS. 2B and 2C. Here, the gap is forced by applying attenuation G to a playback signal over a range ("band") of frequencies defined by a center frequency $f_0$ (indicated in FIG. 2B) and bandwidth B (also indicated in FIG. 2B), with the attenuation varying as a function of time at each frequency in the frequency band (for example, in each frequency bin within the frequency band) with a profile resembling that shown in FIG. 2C. The maximum value of the attenuation G (as a function of frequency across the band) may be controlled to increase from 0 dB (at the lowest frequency of the band) to a maximum attenuation (suppression depth) Z at the center frequency $f_0$ (as indicated in FIG. 2B), and to decrease (with increasing frequency above the center frequency) to 0 dB (at the highest frequency of the band).

In this example, the graph of FIG. 2B indicates a profile of the band attenuation G, as a function of frequency (i.e., frequency bin), applied to frequency components of an audio signal to force a gap in audio content of the signal in the band. The audio signal may be a playback signal (e.g., a channel of a multi-channel playback signal), and the audio content may be playback content.

According to this example, the graph of FIG. 2C shows a profile of the band attenuation G, as a function of time, applied to the frequency component at center frequency $f_0$, to force the gap indicated in FIG. 2B in audio content of the signal in the band. For each other frequency component in the band, the band gain as a function of time may have a similar profile to that shown in FIG. 2C, but the suppression depth Z of FIG. 2C may be replaced by an interpolated suppression depth kZ, where k is a factor which ranges from 0 to 1 (as a function of frequency) in this example, so that kZ has the profile shown in FIG. 2B. In some examples, for each frequency component, the attenuation G may also be interpolated (e.g., as a function of time) from 0 dB to the suppression depth kZ (e.g., with k=1, as indicated in FIG. 2C, at the center frequency), e.g., to reduce musical artifacts resulting from introduction of the gap. Three regions (time intervals), t1, t2, and t3, of this latter interpolation are shown in FIG. 2C.

Thus, when a gap forcing operation occurs for a particular frequency band (e.g., the band centered at center frequency, $f_0$, shown in FIG. 2B), in this example the attenuation G applied to each frequency component in the band (e.g., to each bin within the band) follows a trajectory as shown in FIG. 2C. Starting at 0 dB, it drops to a depth −kZ dB in t1 seconds, remains there for t2 seconds, and finally rises back to 0 dB in t3 seconds. In some implementations, the total time t1+t2+t3 may be selected with consideration of the time-resolution of whatever frequency transform is being used to analyze the microphone feed, as well as a reasonable duration of time that is not too intrusive for the user. Some examples of t1, t2 and t3 for single-device implementations are shown in Table 1, below.

Some disclosed methods involve inserting forced gaps in accordance with a predetermined, fixed banding structure that covers the full frequency spectrum of the audio playback signal, and includes $B_{count}$ bands (where $B_{count}$ is a number, e.g., $B_{count}$=49). To force a gap in any of the bands, a band attenuation is applied in the band in such examples. Specifically, for the jth band, an attenuation, Gj, may be applied over the frequency region defined by the band.

Table 1, below, shows example values for parameters t1, t2, t3, the depth Z, for each band, and an example of the number of bands, $B_{count}$, for single-device implementations.

TABLE 1

| Parameter | Default | Minimum | Maximum | Units | Purpose |
|---|---|---|---|---|---|
| $B_{count}$ | 49 | 20 | 128 | — | Number of discrete groupings of frequency bins, referred to as "bands" |
| Z | −12 | −12 | −18 | dB | Maximum attenuation applied in the forced gap in a band. |
| t1 | 8 | 5 | 15 | Milliseconds | Time to ramp gain down to −Z dB at the center frequency of a band once a forced gap is triggered. |
| t2 | 80 | 40 | 120 | Milliseconds | Time to apply attenuation −Z dB after t1 seconds. |
| t3 | 8 | 5 | 15 | Milliseconds | Time to ramp gain up to 0 dB after t1 + t2 elapses. |

In determining the number of bands and the width of each band, a trade-off exists between perceptual impact and usefulness of the gaps: narrower bands with gaps are better in that they typically have less perceptual impact, whereas wider bands with gaps are better for implementing noise estimation (and other pervasive listening methods) and reducing the time ("convergence" time) required to converge to a new noise estimate (or other value monitored by pervasive listening), in all frequency bands of a full frequency spectrum, e.g., in response to a change in background noise or playback environment status). If only a limited number of gaps can be forced at once, it will take a longer time to force gaps sequentially in a large number of small bands than to force gaps sequentially in a smaller number of larger bands, resulting in a relatively longer convergence time. Larger bands (with gaps) provide a lot of information about the background noise (or other value monitored by pervasive listening) at once, but generally have a larger perceptual impact.

In early work by the present inventors, gaps were posed in a single-device context, where the echo impact is mainly (or entirely) nearfield. Nearfield echo is largely impacted by the direct path of audio from the speakers to the microphones. This property is true of almost all compact duplex audio devices, (such as smart audio devices) with the exceptions being devices with larger enclosures and significant acoustic decoupling. By introducing short, perceptually masked gaps in the playback, such as those shown in Table 1, an audio device may obtain glimpses of the acoustic space in which the audio device is deployed through the audio device's own echo.

However, when other audio devices are also playing content in the same audio environment, the present inventors have discovered that the gaps of a single audio device become less useful due to far-field echo corruption. Far-field echo corruption frequently lowers the performance of the local echo cancellation, significantly worsening the overall system performance. Far-field echo corruption is difficult to remove for various reasons. One reason is that obtaining a reference signal may require increased network bandwidth and added complexity for additional delay estimation. Moreover, estimating the far-field impulse response is more difficult as noise conditions are increased and the response is longer (more reverberant and spread out in time). In addition, far-field echo corruption is usually correlated with the near-field echo and other far-field echo sources, further challenging the far-field impulse response estimation.

The present inventors have discovered that if multiple audio devices in an audio environment orchestrate their gaps in time and frequency, a clearer perception of the far-field (relative to each audio device) may be obtained when the multiple audio devices reproduce the modified audio playback signals. The present inventors have also discovered that if a target audio device plays back unmodified audio playback signals when the multiple audio devices reproduce the modified audio playback signals, the relative audibility and position of the target device can be estimated from the perspective of each of the multiple audio devices, even whilst media content is being played.

Moreover, and perhaps counter-intuitively, the present inventors have discovered that breaking the guidelines that were formerly used for single-device implementations (e.g., keeping the gaps open for a longer period of time than indicated in Table 1) leads to implementations suitable for multiple devices making co-operative measurements via orchestrated gaps.

For example, in some orchestrated gap implementations, t2 may be longer than indicated in Table 1, in order to accommodate the various acoustic path lengths (acoustic delays) between multiple distributed devices in an audio environment, which may be on the order of meters (as opposed to a fixed microphone-speaker acoustic path length on a single device, which may be tens of centimeters apart at most). In some examples, the default t2 value may be, e.g., 25 milliseconds greater than the 80 millisecond value indicated in Table 1, in order to allow for up to 8 meters of separation between orchestrated audio devices. In some orchestrated gap implementations, the default t2 value may be longer than the 80 millisecond value indicated in Table 1 for another reason: in orchestrated gap implementations, t2 is preferably longer in order to accommodate timing mis-alignment of the orchestrated audio devices, in order to ensure that an adequate amount of time passes during which all orchestrated audio devices have reached the value of Z attenuation. In some examples, an additional 5 milliseconds may be added to the default value of t2 to accommodate timing mis-alignment. Therefore, in some orchestrated gap implementations, the default value of t2 may be 110 milliseconds, with a minimum value of 70 milliseconds and a maximum value of 150 milliseconds.

In some orchestrated gap implementations, t1 and/or t3 also may be different from the values indicated in Table 1. In some examples, t1 and/or t3 may be adjusted as a result of a listener not being able to perceive the different times that the devices go into or come out of their attenuation period due to timing issues and physical distance discrepancies. At least in part because of spatial masking (resulting from multiple devices playing back audio from different locations), the ability of a listener to perceive the different times at which orchestrated audio devices go into or come out of their attenuation period would tend to be less than in a single-device scenario. Therefore, in some orchestrated gap implementations the minimum values of t1 and t3 may be reduced and the maximum values of t1 and t3 may be increased, as compared to the single-device examples shown in Table 1. According to some such examples, the minimum values of t1 and t3 may be reduced to 2, 3 or 4 milliseconds and the maximum values of t1 and t3 may be increased to 20, 25 or 30 milliseconds.

Examples of Measurements Using Orchestrated Gaps

Figure 2D:
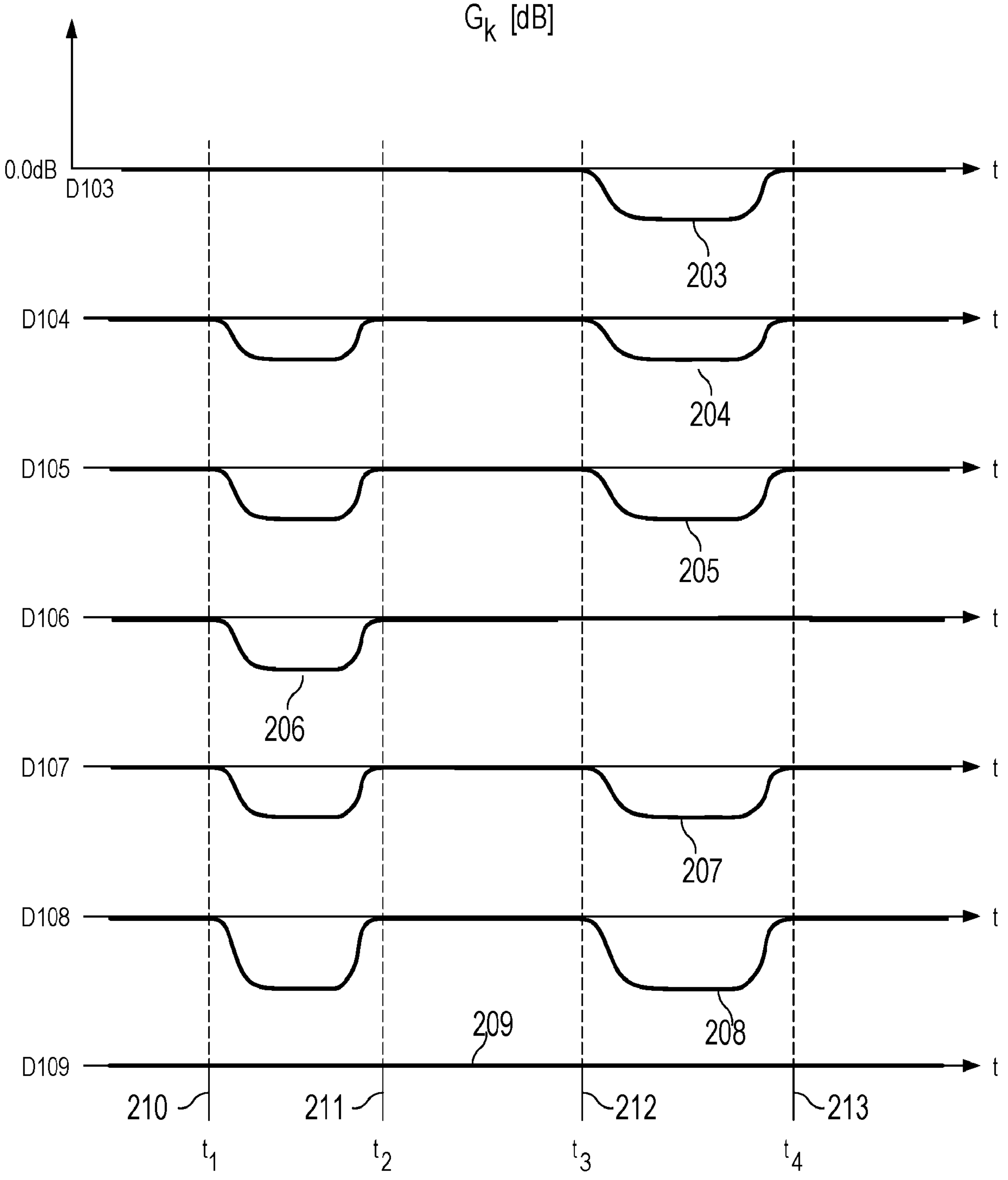
FIG. 2D shows an example of modified audio playback signals including orchestrated gaps for multiple audio devices of an audio environment.

FIG. 2D shows an example of modified audio playback signals including orchestrated gaps for multiple audio devices of an audio environment. In this implementation, multiple smart devices of an audio environment orchestrate gaps in order to estimate the relative audibility of one another. In this example, one measurement session corresponding to one gap is made during a time interval, and the measurement session includes only the devices in the main living space 100*a* of FIG. 1B. According to this example, previous audibility data has shown that smart audio device 109, which is located in the room 101*b*, has already been classified as barely audible to the other audio devices and has been placed in a separate zone.

In the examples shown in FIG. 2D, the orchestrated gaps are attenuations of playback content using a band attenuation $G_k$, wherein k represents a center frequency of a frequency band being measured. The elements shown in FIG. 2D are as follows:

- Graph 203 is a plot of $G_k$ in dB for smart audio device 103 of FIG. 1B;
- Graph 204 is a plot of $G_k$ in dB for smart audio device 104 in FIG. 1B;
- Graph 205 is a plot of $G_k$ in dB for smart audio device 105 in FIG. 1B;
- Graph 206 is a plot of $G_k$ in dB for smart audio device 106 in FIG. 1B;
- Graph 207 is a plot of $G_k$ in dB for smart audio device 107 in FIG. 1B;
- Graph 208 is a plot of $G_k$ in dB for smart audio device 108 in FIG. 1B; and
- Graph 209 is a plot of $G_k$ in dB for smart audio device 109 in FIG. 1B.

As used herein, the term "session" (also referred to herein as a "measurement session") refers to a time period during which measurements of a frequency range are performed. During a measurement session, a set of frequencies with associated bandwidths, as well as a set of participating audio devices, may be specified.

One audio device may optionally be nominated as a "target" audio device for a measurement session. If a target audio device is involved in the measurement session, according to some examples the target audio device will be permitted to ignore the forced gaps and will play unmodified audio playback signals during the measurement session. According to some such examples, the other participating audio devices will listen to the target device playback sound, including the target device playback sound in the frequency range being measured.

As used herein, the term "audibility" refers to the degree to which a device can hear another device's speaker output. Some examples of audibility are provided below.

According to the example shown in FIG. 2D, at time t1, an orchestrating device initiates a measurement session with smart audio device 103 being the target audio device, selecting one or more bin center frequencies to be measured, including a frequency k. The orchestrating device may, in some examples, be a smart audio device acting as the leader (e.g., determined as described below with reference to FIG. 4) In other examples, the orchestrating device may be another orchestrating device, such as a smart home hub. This measurement session runs from time t1 until time t2. The other participating smart audio devices, smart audio devices 104-108, will apply a gap in their output and will reproduce modified audio playback signals, whilst the smart audio device 103 will play unmodified audio playback signals.

The subset of smart audio devices of the audio environment 100 that are reproducing modified audio playback signals including orchestrated gaps (smart audio devices 104-108) is one example of what may be referred to as M audio devices. According to this example, the smart audio device 109 will also play unmodified audio playback signals. Therefore, the smart audio device 109 is not one of the M audio devices. However, because the smart audio device 109 is not audible to the other the smart audio devices of the audio environment, the smart audio device 109 is not a target audio device in this example, despite the fact that the smart audio device 109 and the target audio device (the smart audio device 103 in this example) will both play back unmodified audio playback signals.

It is desirable that the orchestrated gaps should have a low perceptual impact (e.g., a negligible perceptual impact) to listeners in the audio environment during the measurement session. Therefore, in some examples gap parameters may be selected to minimize perceptual impact. Some examples are described below with reference to FIGS. 3B-3J.

During this time (the measurement session from time t1 until time t2), the smart audio devices 104-108 will receive reference audio bins from the target audio device (the smart audio device 103) for the time-frequency data for this measurement session. In this example, the reference audio bins correspond to playback signals that the smart audio device 103 uses as a local reference for echo cancellation. The smart audio device 103 has access to these reference audio bins for the purposes of audibility measurement as well as echo cancellation.

According to this example, at time t2 the first measurement session ends and the orchestrating device initiates a new measurement session, this time choosing one or more bin center frequencies that do not include frequency k. In the example shown in FIG. 2D, no gaps are applied for frequency k during the period t2 to t3, so the graphs show unity gain for all devices. In some such examples, the orchestrating device may cause a series of gaps to be inserted into each of a plurality of frequency ranges for a sequence of measurement sessions for bin center frequencies that do not include frequency k. For example, the orchestrating device may cause second through $N^{th}$ gaps to be inserted into second through $N^{th}$ frequency ranges of the audio playback signals during second through $N^{th}$ time intervals, for the purpose of second through $N^{th}$ subsequent measurement sessions while the smart audio device 103 remains the target audio device.

In some such examples, the orchestrating device may then select another target audio device, e.g., the smart audio device 104. The orchestrating device may instruct the smart audio device 103 to be one of the M smart audio devices that are playing back modified audio playback signals with orchestrated gaps. The orchestrating device may instruct the new target audio device to reproduce unmodified audio playback signals. According to some such examples, after the orchestrating device has caused N measurement sessions to take place for the new target audio device, the orchestrating device may select another target audio device. In some such examples, the orchestrating device may continue to cause measurement sessions to take place until measurement sessions have been performed for each of the participating audio devices in an audio environment.

In the example shown in FIG. 2D, a different type of measurement session takes place between times t3 and t4. According to this example, at time t3, in response to user input (e.g., a voice command to a smart audio device that is acting as the orchestrating device), the orchestrating device initiates a new session in order to fully calibrate the loudspeaker setup of the audio environment 100. In general, a user may be relatively more tolerant of orchestrated gaps that have a relatively higher perceptual impact during a "set-up" or "recalibration" measurement session such as takes place between times t3 and t4. Therefore, in this example a large contiguous set of frequencies are selected for measurement, including k. According to this example, the smart audio device 106 is selected as the first target audio device during this measurement session. Accordingly, during the first phase of the measurement session from time t3 to t4, all of the smart audio devices aside from the smart audio device 106 will apply gaps.

Gap Bandwidth

Figure 3A:
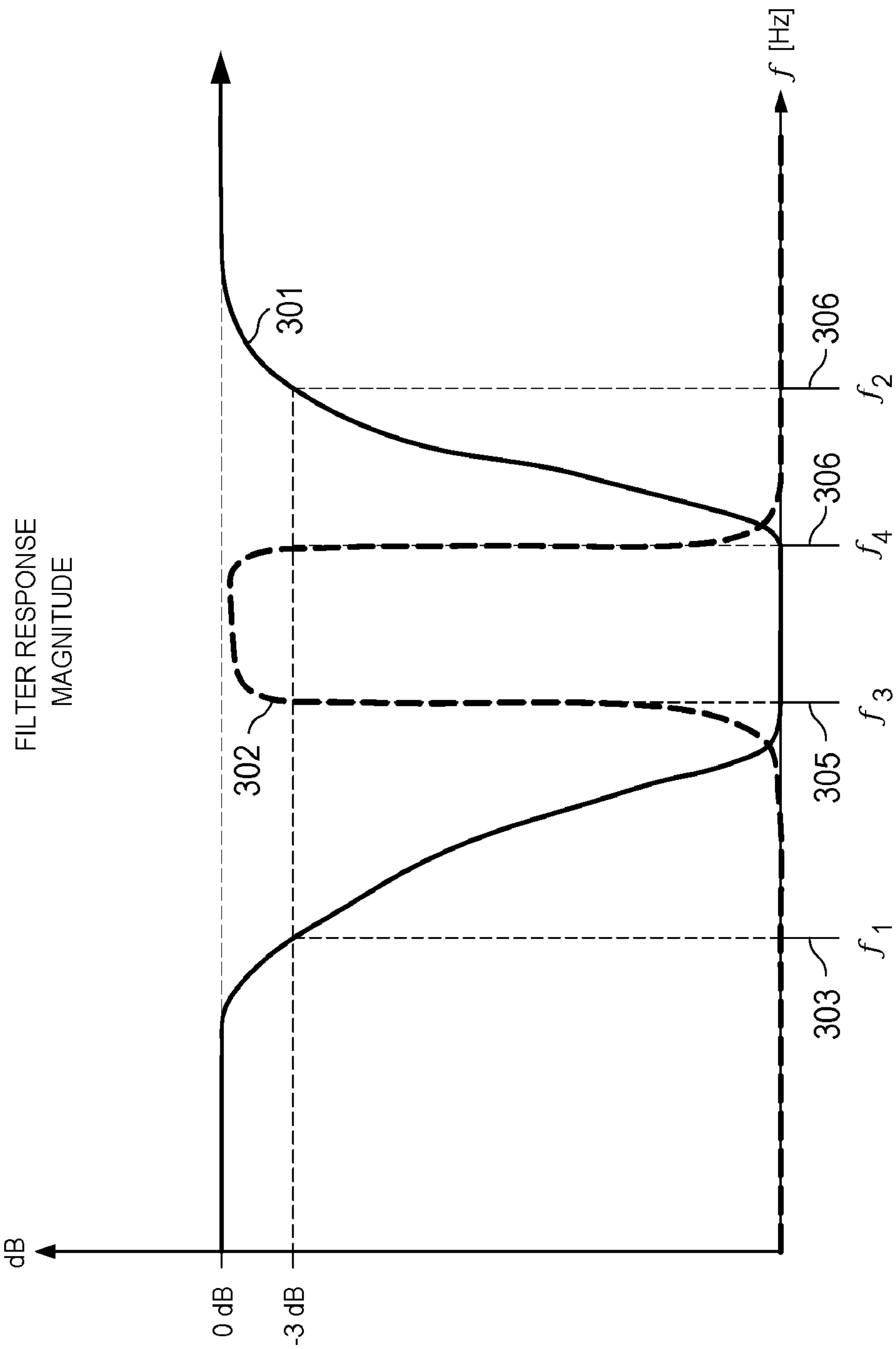
FIG. 3A is a graph that shows examples of a filter response used for creating a gap and a filter response used to measure a frequency region of a microphone signal used during a measurement session.

FIG. 3A is a graph that shows examples of a filter response used for creating a gap and a filter response used to measure a frequency region of a microphone signal used during a measurement session. According to this example, the elements of FIG. 3A are as follows:

Element 301 represents the magnitude response of the filter used to create the gap in the output signal;

Element 302 represents the magnitude response of the filter used to measure the frequency region corresponding to the gap caused by element 301;

Elements 303 and 304 represent the −3 dB points of 301, at frequencies f1 and f2; and Elements 305 and 306 represent the −3 dB points of 302, at frequencies f3 and f4.

The bandwidth of the gap response 301 (BW_gap) may be found by taking the difference between the −3 dB points 303 and 304: BW_gap=f2−f1 and BW_measure (the bandwidth of the measurement response 302)=f4−f3.

According to one example, the quality of the measurement may be expressed as follows:

$$\text{quality} = \frac{BW_{gap}}{BW_{measure}} = \frac{f_2 - f_1}{f_4 - f_3}$$

Because the bandwidth of the measurement response is usually fixed, one can adjust the quality of the measurement by increasing the bandwidth of the gap filter response (e.g., widen the bandwidth). However, the bandwidth of the introduced gap is proportional to its perceptibility. Therefore, the bandwidth of the gap filter response should generally be determined in view of both the quality of the measurement and the perceptibility of the gap. Some examples of quality values are shown in Table 2:

TABLE 2

| Parameter | Default | Minimum | Maximum | Units | Purpose |
|---|---|---|---|---|---|
| quality | 2 | 1.5 | 3 | — | Measures the confidence measurements made through forced gaps |

Although Table 2 indicates "minimum" and "maximum" values, those values are only for this example. Other implementations may involve lower quality values than 1.5 and/or higher quality values than 3.

Gap Allocation Strategies

Gaps may be defined by the following:

An underlying division of the frequency spectrum, with center frequencies and measurement bandwidths;

An aggregation of these smallest measurement bandwidths in a structure referred to as "banding";

A duration in time, attenuation depth, and the inclusion of one or more contiguous frequencies that conform to the agreed upon division of the frequency spectrum; and Other temporal behavior such as ramping the attenuation depth at the beginning and end of a gap.

According to some implementations, gaps may be selected according to a strategy that will aim to measure and observe as much of the audible spectrum in as short as time as possible, whilst meeting the applicable perceptibility constraints.

FIGS. 3B, 3C, 3D, 3E, 3F. 3G, 3H, 3I and 3J are graphs that show examples of gap allocation strategies. In these examples, time is represented by distance along the horizontal axis and frequency is represented by distance along the vertical axis. These graphs provide examples to illustrate the patterns produced by various gap allocation strategies, and how long they take to measure the complete audio spectrum. In these examples, each orchestrated gap measurement session is 10 seconds in length. As with other disclosed implementations, these graphs are merely provided by way of example. Other implementations may include more, fewer and/or different types, numbers and/or sequences of elements. For example, in other implementations each orchestrated gap measurement session may be longer or shorter than 10 seconds. In these examples, unshaded regions 310 of the time/frequency space represented in FIGS. 3B-3J (which may be referred to herein as "tiles") represent a gap at the indicated time-frequency period (of 10 seconds). Moderately-shaded regions 315 represent frequency tiles that have been measured at least once. Lightly-shaded regions 320 have yet to be measured.

Assuming the task at hand requires that the participating audio devices insert orchestrated gaps for "listening through to the room" (e.g., to evaluate the noise, echo, etc., in the audio environment), then the measurement session completion times will be as they are indicated in FIGS. 3B-3J. If the task requires that each audio device is made the target in turn, and listened to by the other audio devices, then the times need to be multiplied by the number of audio devices participating in the process. For example, if each audio device is made the target in turn, the three minutes and twenty seconds (3 m 20 s) shown as the measurement session completion time in FIG. 3B would mean that a system of 7 audio devices would be completely mapped after 7*3 m 20 s=23 m 20 s. When cycling through frequencies/bands, and multiple gaps are forced at once, in these examples the gaps will be spaced as far apart in frequency as possible for efficiency when covering the spectrum.

Figure 3B:
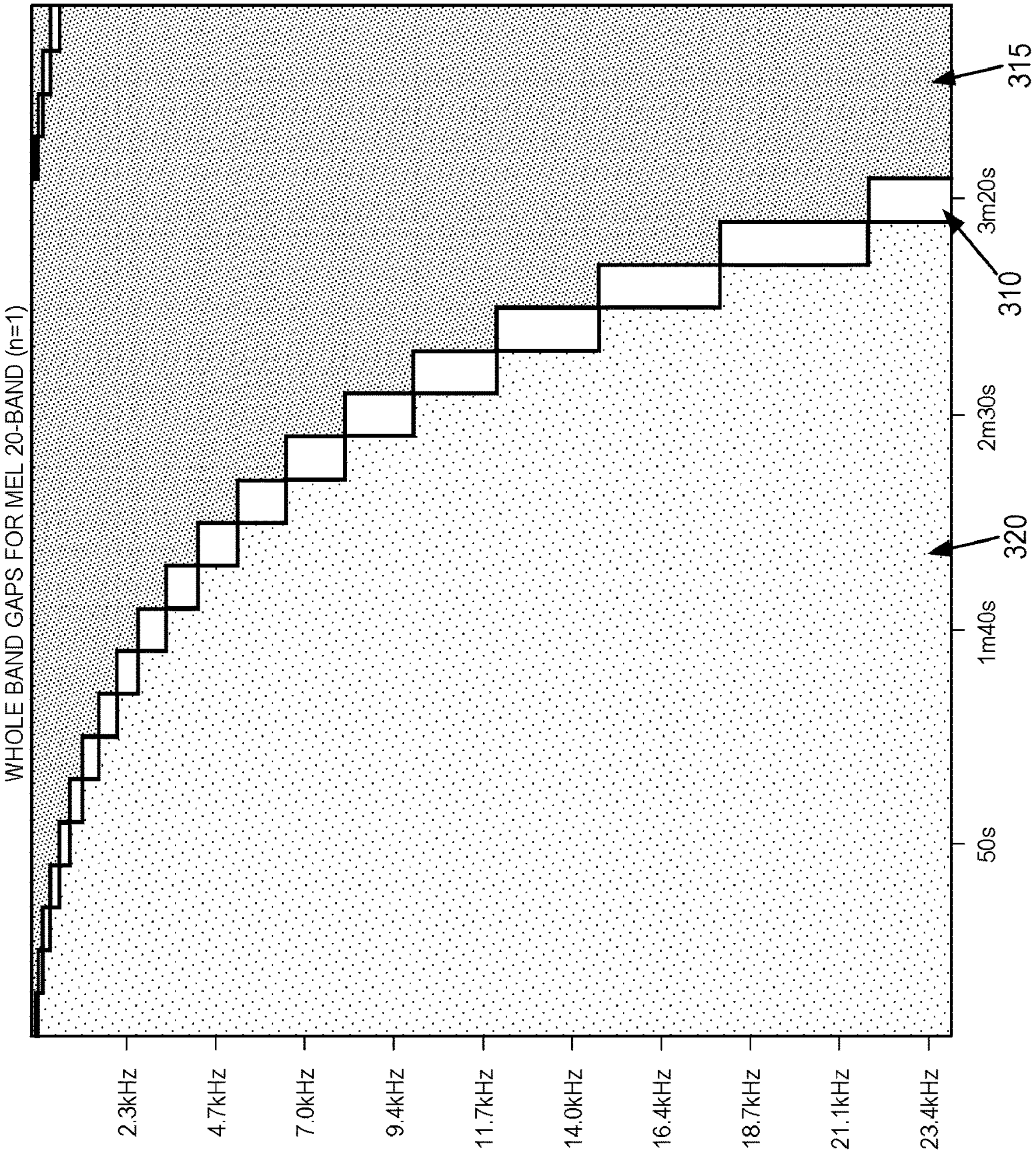
FIGS. 3B, 3C, 3D, 3E, 3F, 3G, 3H, 3I and 3J are graphs that show examples of gap allocation strategies.
Figure 3C:
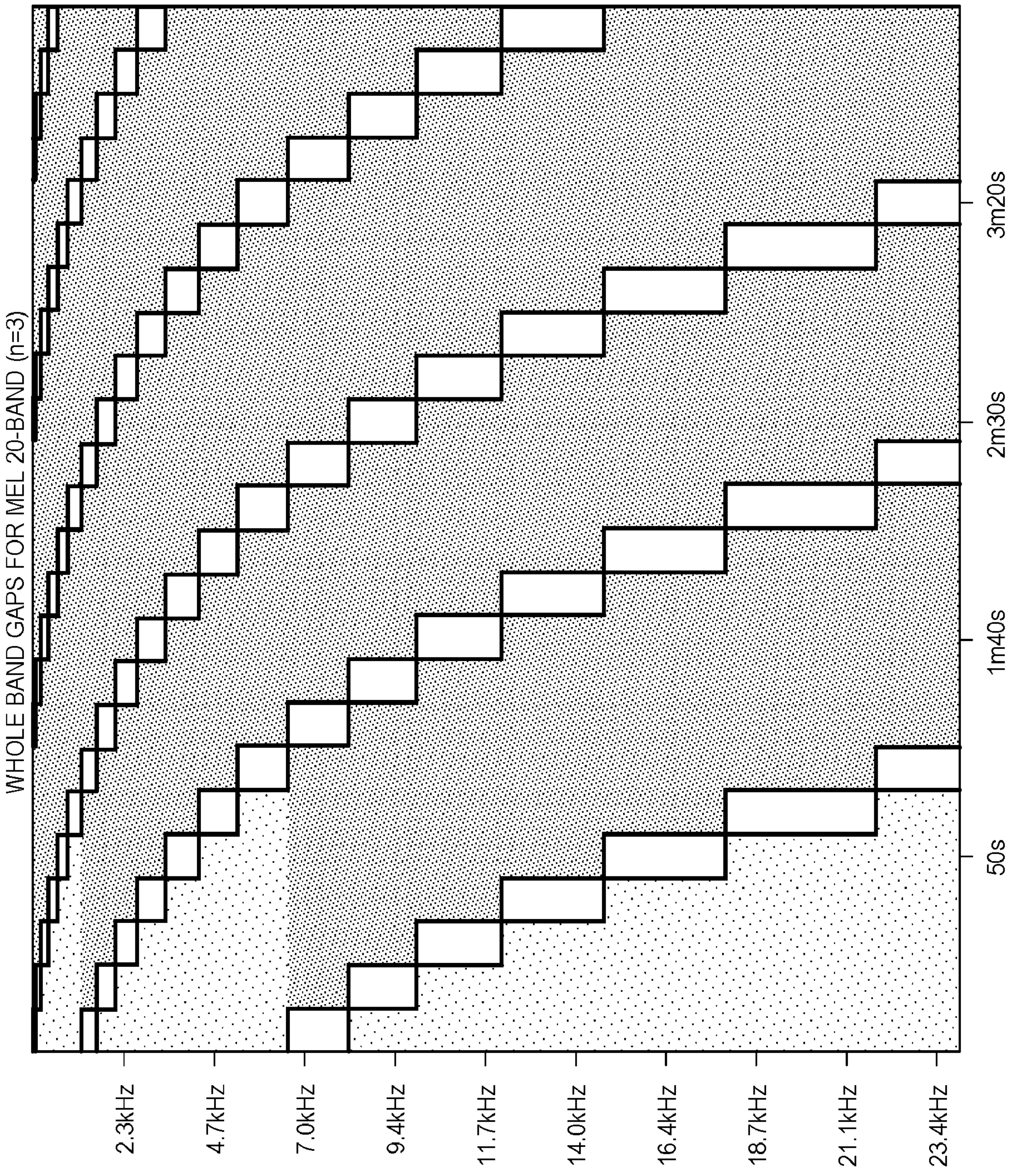

FIGS. 3B and 3C are graphs that show examples of sequences of orchestrated gaps according to one gap allocation strategy. In these examples, the gap allocation strategy involves gapping N entire frequency bands (each of the frequency bands including at least one frequency bin, and in most cases a plurality of frequency bins) at a time during each successive measurement session. In FIG. 3B N=1 and in FIG. 3C N=3, the latter of which means that example of FIG. 3C involves inserting three gaps during the same time interval. In these examples, the banding structure used is a 20-band Mel spaced arrangement. According to some such examples, after all 20 frequency bands have been measured, the sequence may restart. Although 3 m 20 s is a reasonable time to reach a full measurement, the gaps being punched in the critical audio region of 300 Hz-8 kHz are very wide, and much time is devoted to measuring outside this region. Because of the relatively wide gaps in the frequency range of 300 Hz-8 kHz, this particular strategy will be very perceptible to users.

Figure 3D:
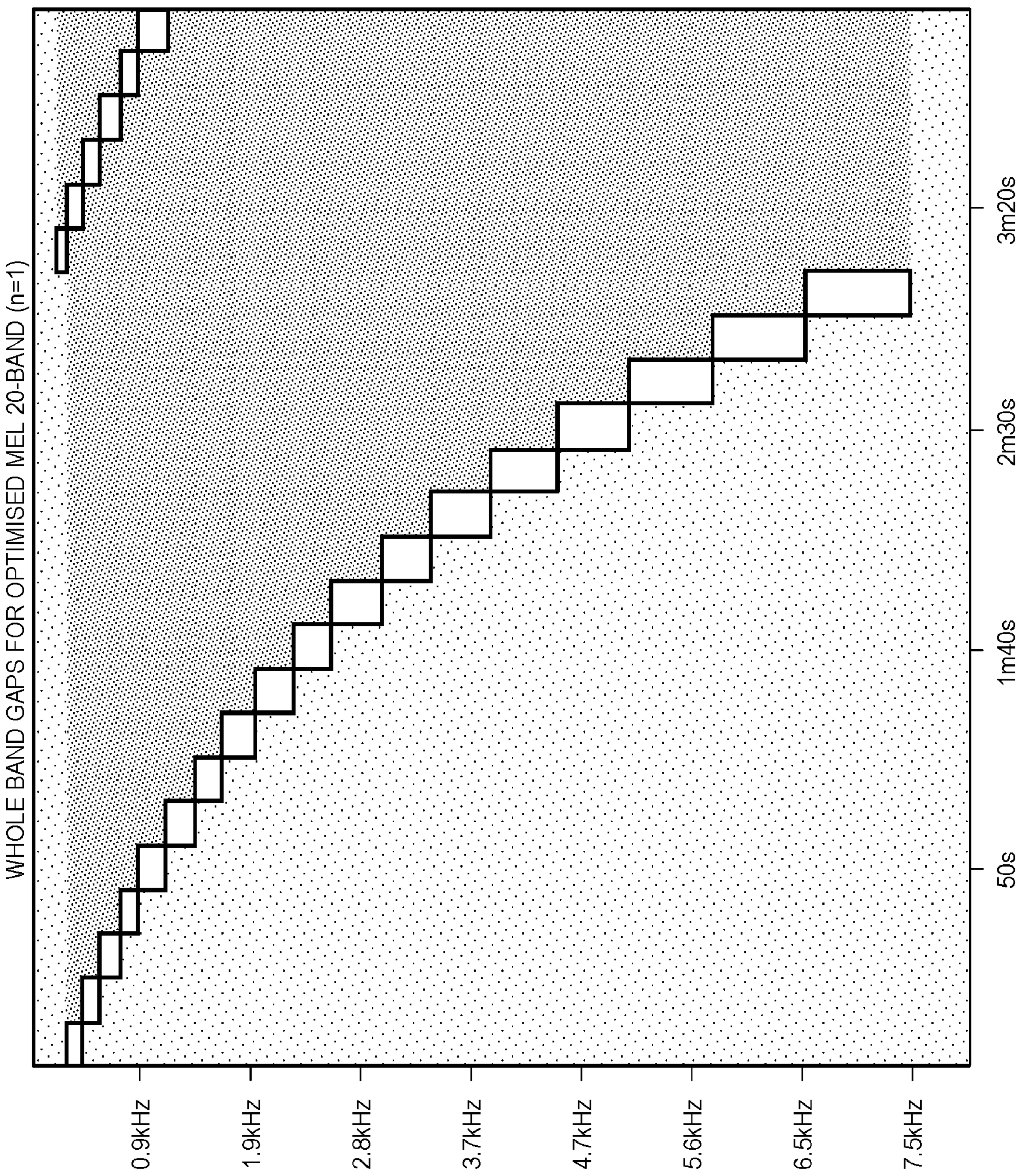
Figure 3E:
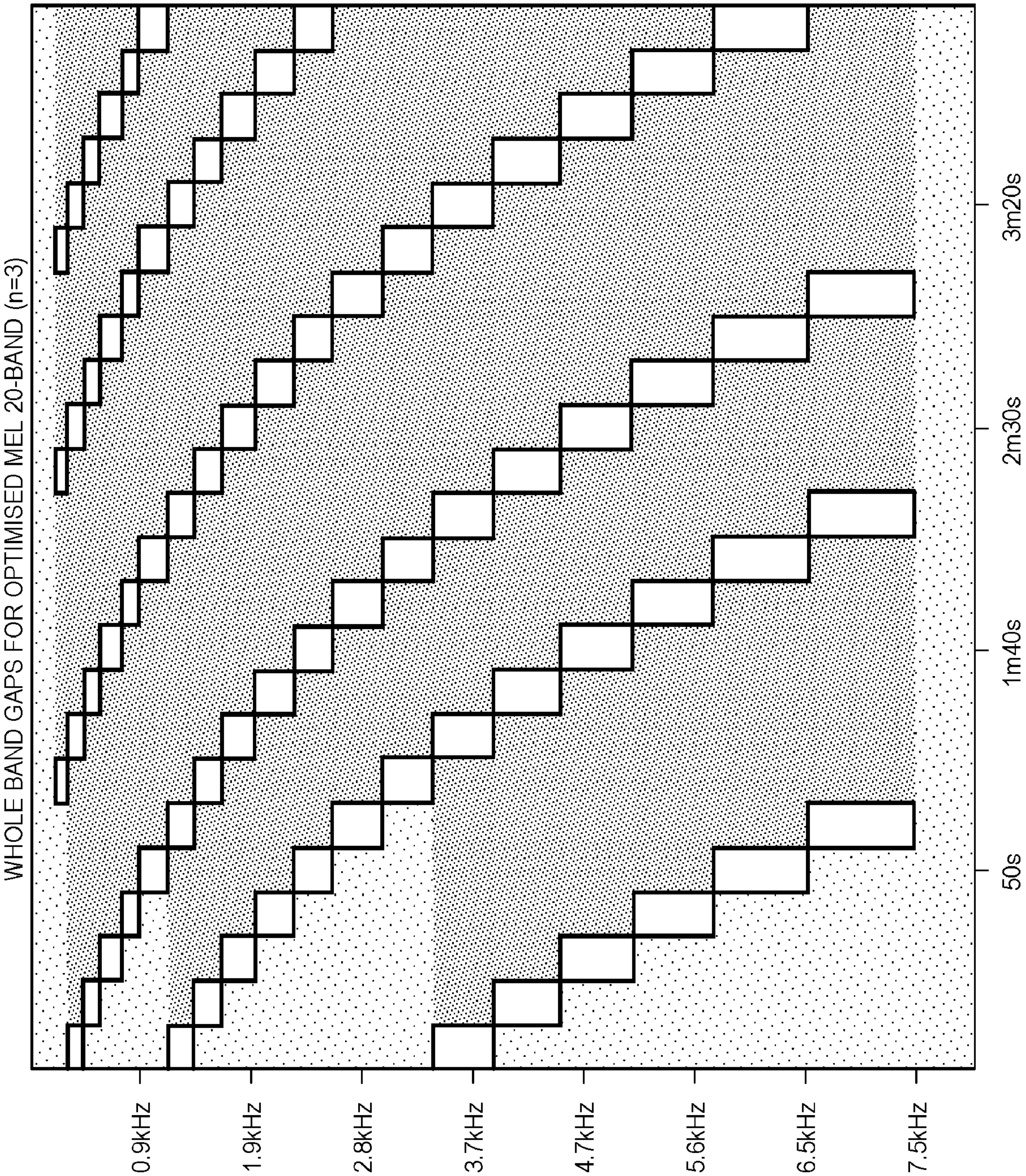

FIGS. 3D and 3E are graphs that show examples of sequences of orchestrated gaps according to another gap allocation strategy. In these examples, the gap allocation strategy involves modifying the banding structure shown in FIGS. 3B and 3C to map to the "optimized" frequency region of approximately 300 Hz to 8 kHz. The overall allocation strategy is otherwise unchanged from that represented by FIGS. 3B and 3C, though the sequence finishes slightly earlier as the 20th band is now ignored. The bandwidths of the gaps being forced here will still be perceptible. However, the benefit is a very rapid measurement of the optimized frequency region, especially if gaps are forced into multiple frequency bands at once.

Figure 3F:
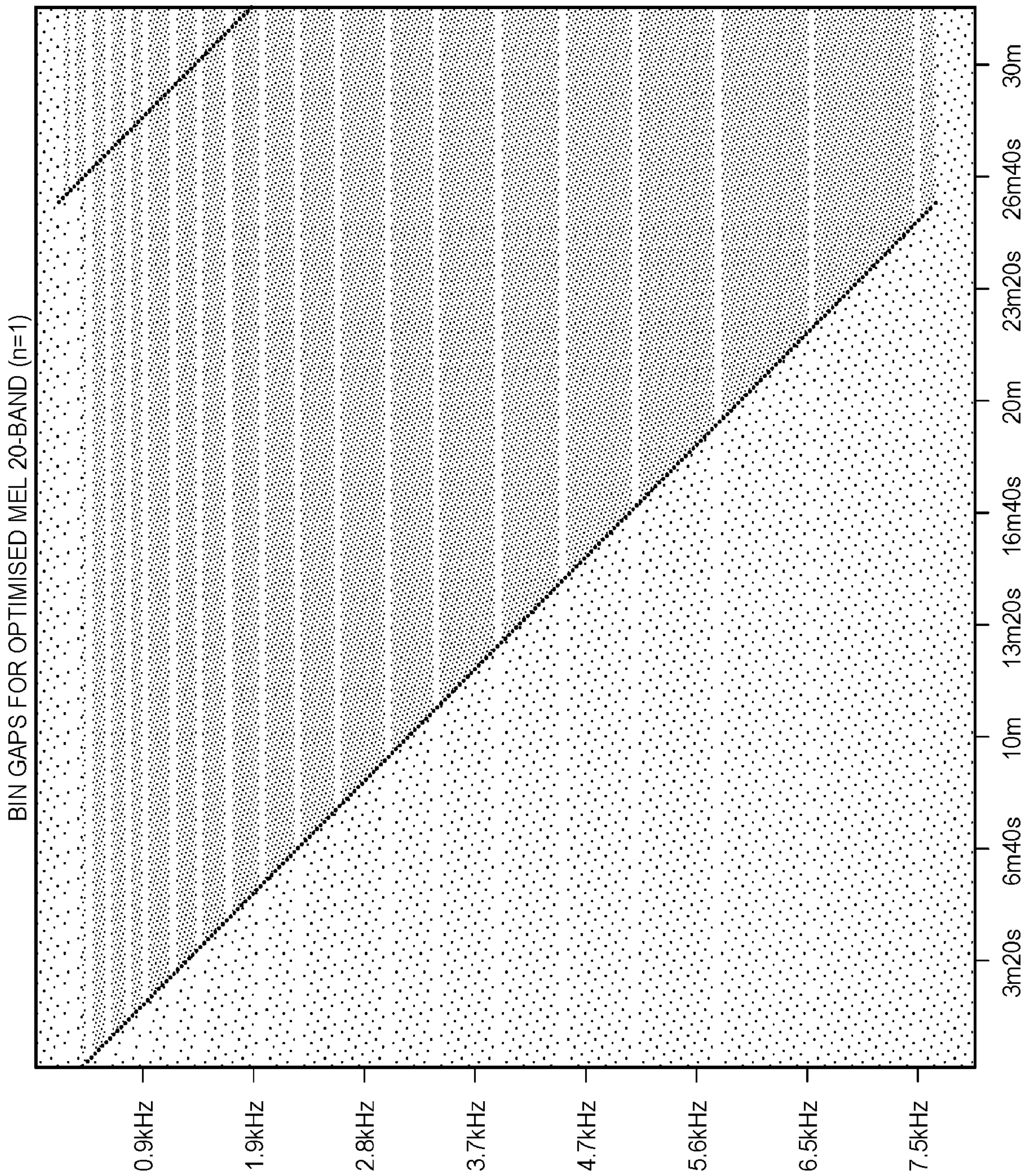
Figure 3G:
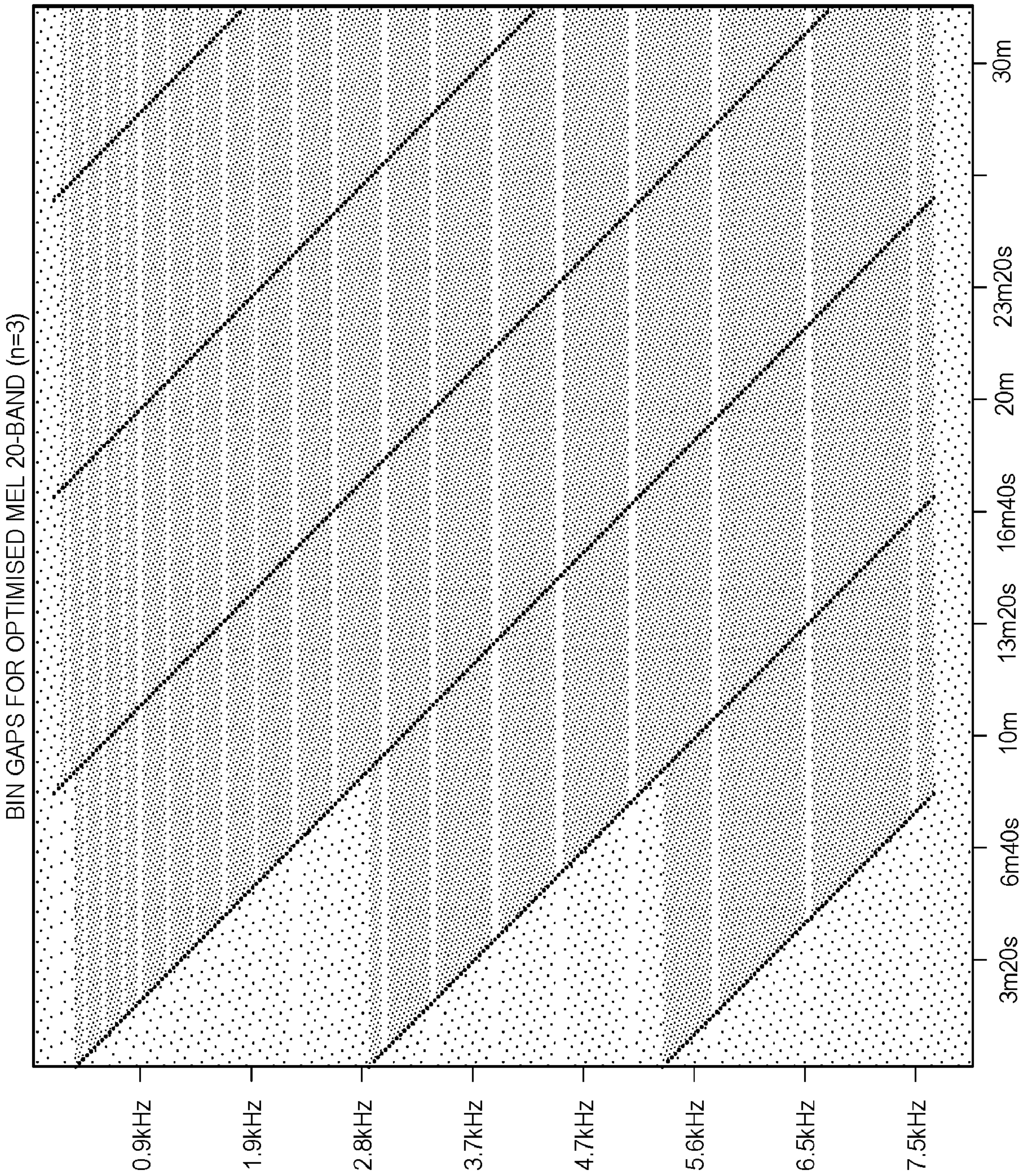
Figure 3H:
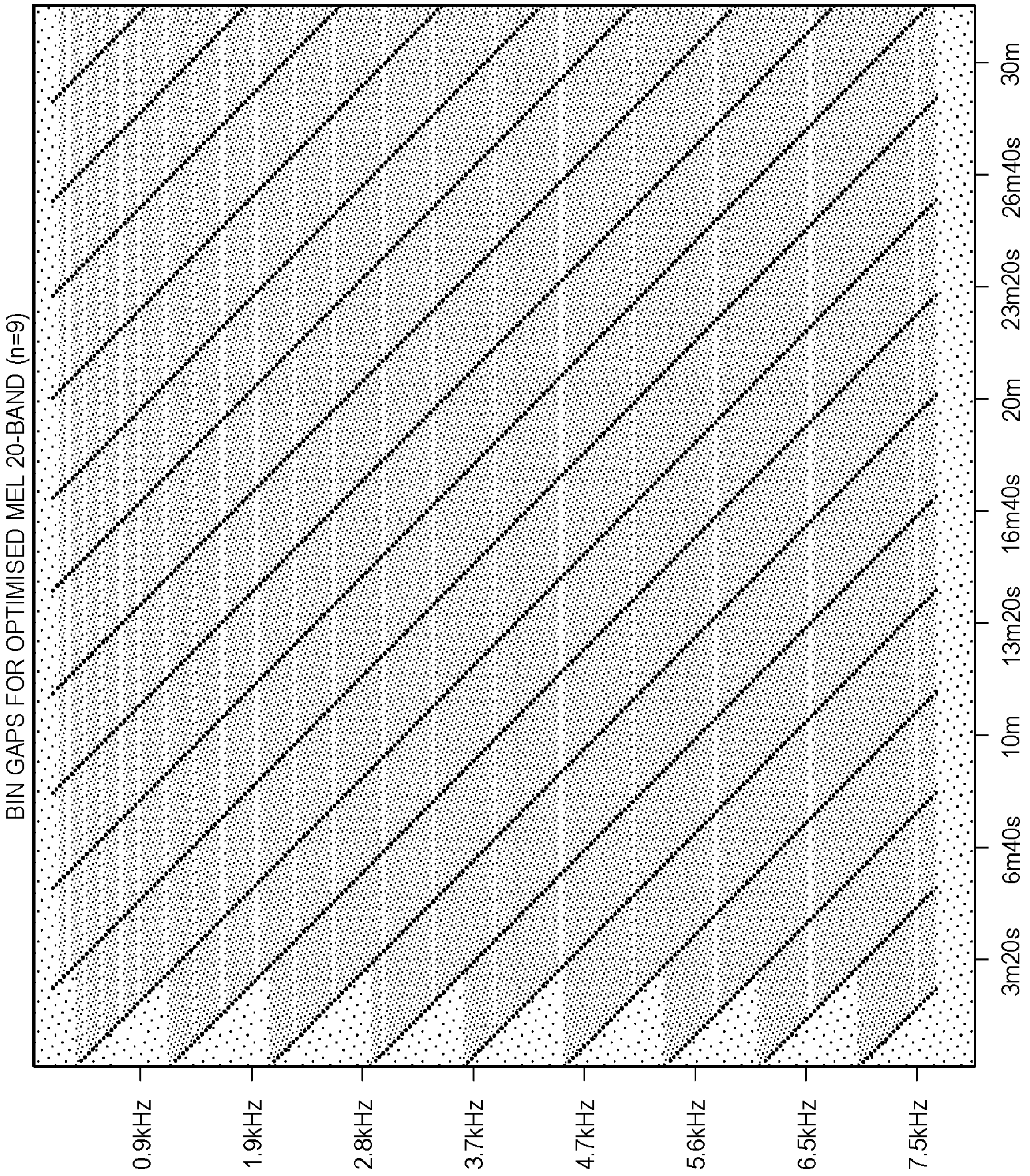

FIGS. 3F, 3G and 3H are graphs that show examples of sequences of orchestrated gaps according to another gap allocation strategy. In these examples, the gap allocation strategy involves a "force bin gaps" approach, wherein gaps are forced into single frequency bins instead of over entire frequency bands. The horizontal lines in FIGS. 3F, 3G and 3H delineate the banding structure shown in FIGS. 3D and 3E. Changing from a gap allocation strategy involving 19 bands to a gap allocation strategy involving 170 bins significantly increases the time taken to measure the optimized spectrum, with a single measurement session now taking over 25 minutes to complete in the example shown in FIG. 3F in which N=1.

The major advantage of the gap allocation strategy represented by FIGS. 3F, 3G and 3H is the significantly lowered perceptibility of the process. Choosing N=3 (as shown in FIG. 3G) or N=5 will decrease the measurement session time of the FIG. 3F example by 1/N as shown in the plots of FIGS. 3F and 3G, and the perceptibility is still manageable.

However, there are still two significant drawbacks to the gap allocation strategy represented by FIGS. 3F, 3G and 3H. One is that the logarithmic nature of the banding structure has been ignored: the bandwidth of gaps at higher frequencies are too conservative based on what is true of human perception. The other drawback is that sequentially stepping through frequencies will completely measure each band before moving onto the next band. Through the imputation of missing data, and the averaging through the banding process, algorithms can still function with some confidence even if a band has not been fully measured.

Figure 3I:
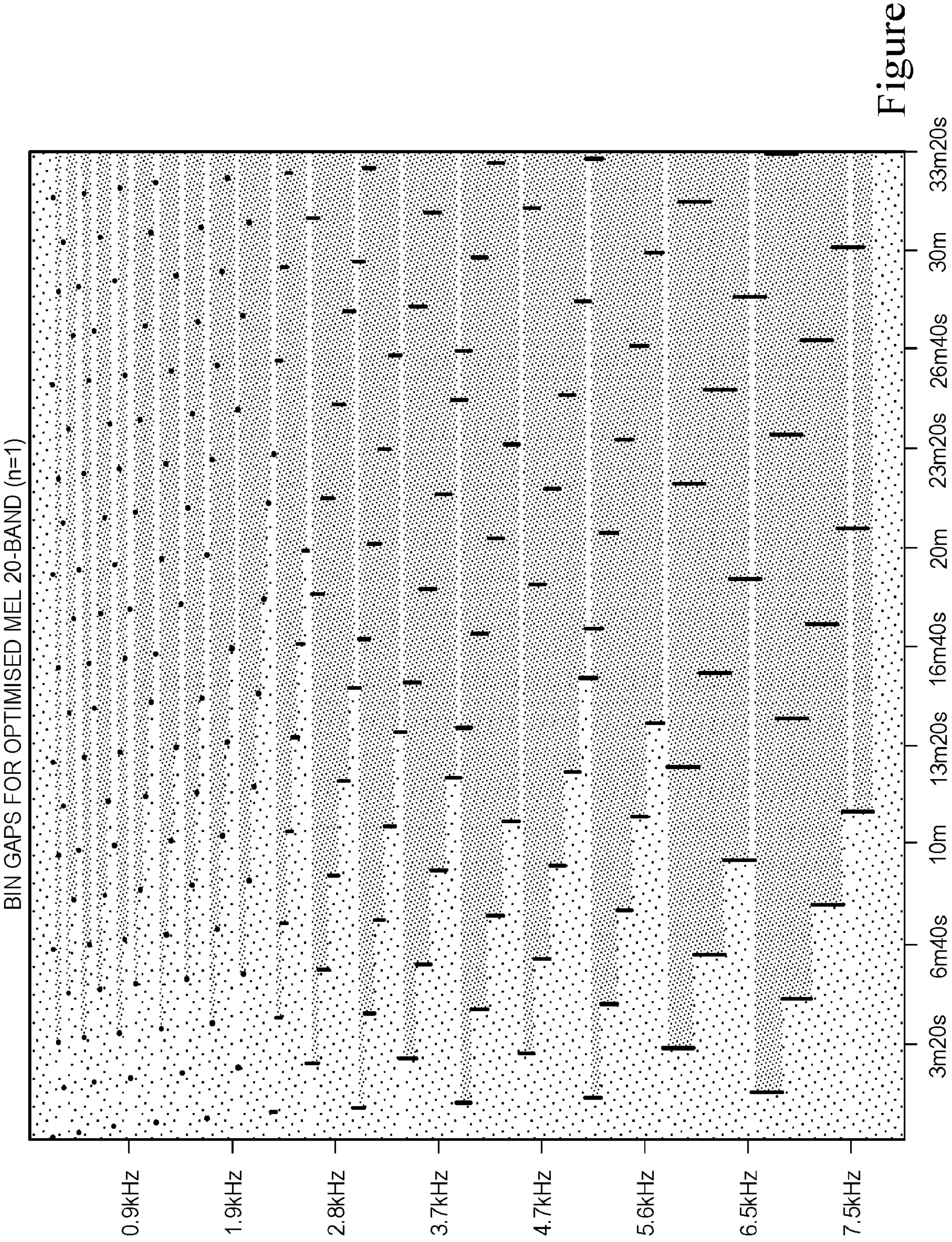
Figure 3J:
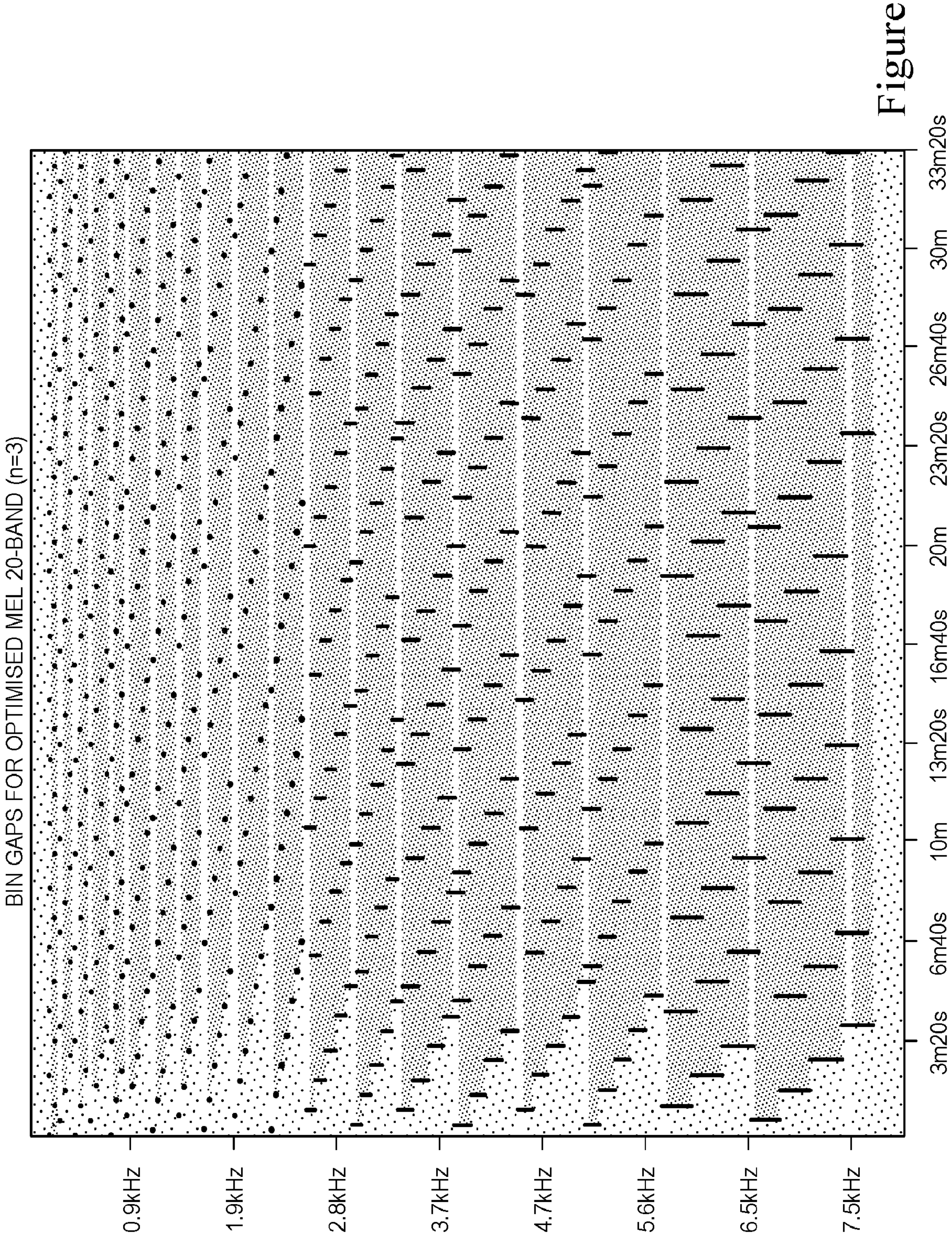

FIGS. 3I and 3J are graphs that show examples of sequences of orchestrated gaps according to another gap allocation strategy. In these examples, the bandwidth of gaps increases with frequency, but at a more conservative rate than the underlying banding structure represented by the horizontal lines in FIGS. 3I and 3J. Increasing the bandwidth of gaps with frequency reduces the overall measurement session time without negatively impacting the perceptibility of the inserted gaps. A second improvement is that for each gap being forced, the gap allocation strategy represented by FIGS. 3I and 3J involves selecting frequency bins within successive frequency bands (this is more evident in FIG. 3I). According to these examples, by remembering/keeping track of the previously measured bin within each band, the next successive bin within that band is measured when that band is revisited. This process does not affect the time taken to measure the complete spectrum, but rapidly reduces the time taken to measure at least a portion of each band at least once. The gap allocation strategy represented by FIGS. 3I and 3J also has a less discernible pattern and structure than the above-described gap allocation strategies, further lowering the perceptibility impact.

Figure 4:
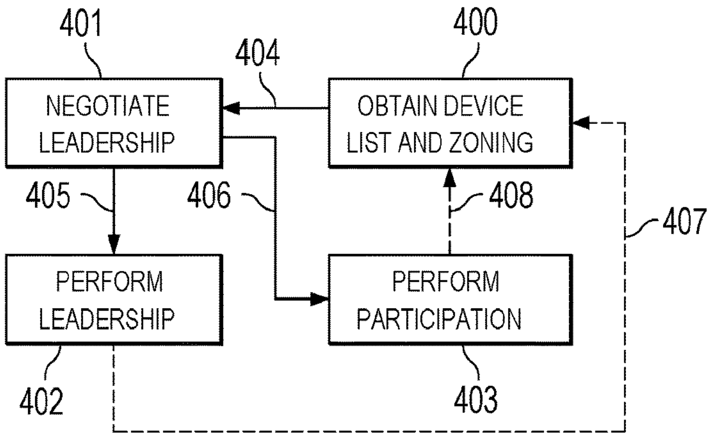
FIGS. 4, 5A and 5B are flow diagrams that show examples of how multiple audio devices coordinate measurement sessions according to some implementations.
Figure 5A:
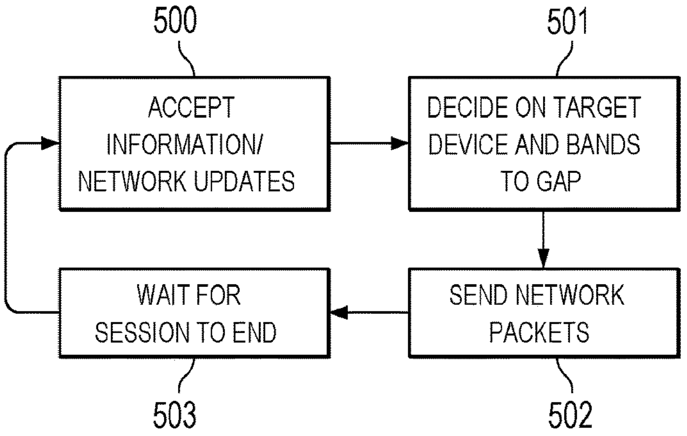
Figure 5B:
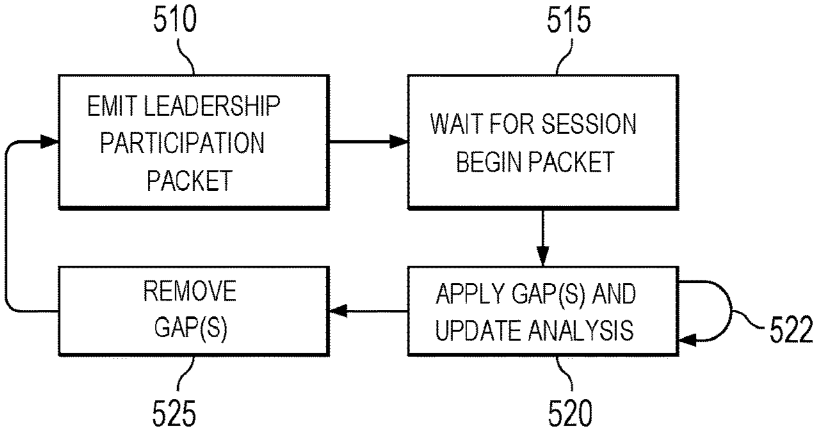

FIGS. 4, 5A and 5B are flow diagrams that show examples of how multiple audio devices coordinate measurement sessions according to some implementations. The blocks shown in FIGS. 4-5B, like those of other methods described herein, are not necessarily performed in the order indicated. For example, in some implementations the operations of block 401 of FIG. 4 may be performed prior to the operations of block 400. Moreover, such methods may include more or fewer blocks than shown and/or described.

According to these examples, a smart audio device is the orchestrating device (which also may be referred to herein as the "leader") and only one device may be the orchestrating device at one time. In other examples, the orchestrating device may be what is referred to herein as a smart home hub. The orchestrating device may be an instance of the apparatus 150 that is described above with reference to FIG. 1C.

FIG. 4 depicts blocks that are performed by all participating audio devices according this this example. In this example, block 400 involves obtaining a list of all the other participating audio devices. According to some such examples, block 400 may involve obtaining an indication of the acoustic zone, group, etc., of each participating audio device. The list of block 400 may, for example, be created by aggregating information from the other audio devices via network packets: the other audio devices may, for example, broadcast their intention to participate in the measurement session. As audio devices are added and/or removed from the audio environment, the list of block 400 may be updated. In some such examples, the list of block 400 may be updated according to various heuristics in order to keep the list up to date regarding only the most important devices (e.g., the audio devices that are currently within the main living space 101_a_ of FIG. 1B).

In the example shown in FIG. 4, the link 404 indicates the passing of the list of block 400 to block 401, the negotiate leadership process. This negotiation process of block 401 may take different forms, depending on the particular implementation. In the simplest embodiments, an alphanumeric sort for the lowest or highest device ID code (or other unique device identifier) may determine the leader without multiple communication rounds between devices, assuming all the devices can implement the same scheme. In more complex implementations, devices may negotiate with one another to determine which device is most suitable to be leader. For instance, it may be convenient for the device that aggregates orchestrated information to also be the leader for the purposes of facilitating the measurement sessions. The device with the highest uptime, the device with the greatest computational ability and/or a device connected to the main power supply may be good candidates for leadership. In general, arranging for such a consensus across multiple devices is a challenging problem, but a problem that has many existing and satisfactory protocols and solutions (for instance, the Paxos protocol). It will be understood that many such protocols exist and would be suitable.

All participating audio devices then go on to perform block 403, meaning that the link 406 is an unconditional link in this example. Block 403 is described below with reference to FIG. 5B. If a device is the leader, it will perform block 402. In this example, the link 405 involves a check for leadership. The leadership process is described below with reference to FIG. 5A. The outputs from this leadership process, including but not limited to messages to the other audio devices, are indicated by link 407 of FIG. 4.

FIG. 5A shows examples of processes performed by the orchestrating device or leader. Block 501 involves selecting a target device to be measured and selecting a gap allocation strategy, e.g., the start and end times of the gaps to be used during the measurement session, and the gaps' locations and size in the frequency. In some examples, block 501 may involve selecting time t1, t2 and/or t3, as described above with reference to FIG. 2C. Different applications may motivate different strategies for the foregoing selections. For example, the target device to be measured may be selected in some examples in part based on a measurement of "urgency," e.g., favouring devices and frequency bands that have not been measured recently. In some instances, a particular target device may be more important to measure based on a specific application or use case. For instance, the position of speakers used for the "left" and "right" channels in a spatial presentation may be generally be important to measure.

According to this example, after the orchestrating device has made the selections of block 501, the process of FIG. 5A continues to block 502. In this example, block 502 involves sending the information determined in block 501 to the other participating audio devices. In some examples, block 502 may involve sending the information to the other participating audio devices via wireless communication, e.g., over a local Wi-Fi network, via Bluetooth, etc. In some examples, block 502 may involve sending the details of the gap allocation strategy to the other participating audio devices, e.g., the start and end times of the gaps to be used during the measurement session, and the gaps' locations and size in the frequency. In other examples, the other participating audio devices may have stored information regarding each of a plurality of gap allocation strategies. In some such examples, block 502 may involve sending an indication of the stored gap allocation strategy to select, e.g., gap allocation strategy 1, gap allocation strategy 2, etc. In some examples, block 502 may involve sending a "session begin" indication, e.g., as described below with reference to FIG. 5B.

According to this example, after the orchestrating device has performed block 502, the process of FIG. 5A continues to block 503, wherein the orchestrating device waits for the current measurement session to end. In this example, in block 503 the orchestrating device waits for confirmations that all of the other participating audio devices have ended their sessions.

In this example, after the orchestrating device has received confirmations from all of the other participating audio devices in block 503, the process of FIG. 5A continues to block 500, wherein the orchestrating device is provided information about the measurement session. Such information may influence the selection and timing of future measurement sessions. In some embodiments, block 500 involves accepting measurements that were obtained during the measurement session from all of the other participating audio devices. The type of received measurements may depend on the particular implementation. According to some examples, the received measurements may be, or may include, microphone signals. Alternatively, or additionally, in some examples the received measurements may be, or may include, audio data extracted from the microphone signals. In some implementations, the orchestrating device may perform (or cause to be performed) one or more operations on the measurements received. For example, the orchestrating device may estimate (or cause to be estimated) a target audio device audibility or a target audio device position based, at least in part, on the extracted audio data. Some implementations may involve estimating a far-field audio environment impulse response and/or audio environment noise based, at least in part, on the extracted audio data.

In the example shown in FIG. 5A, the process will revert to block 501 after block 500 is performed. In some such examples, the process will revert to block 501 a predetermined period of time after block 500 is performed. In some instances, the process may revert to block 501 in response to user input.

FIG. 5B shows examples of processes performed by participating audio devices other than the orchestrating device. Here, block 510 involves each of the other participating audio devices sending a transmission (e.g., a network packet) to the orchestrating device, signalling each device's intention to participate in one or more measurement sessions. In some embodiments, block 510 also may involve sending the results of one or more previous measurement sessions to the leader.

In this example, block 515 follows block 510. According to this example, block 515 involves waiting for notification that a new measurement session will begin, e.g., as indicated via a "session begin" packet.

According to this example, block 520 involves applying a gap allocation strategy according to information provided by the orchestrating device, e.g., along with a "session begin" packet that was awaited in block 515. In this example, block 520 involves applying the gap allocation strategy to generate modified audio playback signals that will be played back by participating audio devices (except the target audio device, if any) during the measurement session. According to this example, block 520 involves detect audio device playback sound via audio device microphones and generating corresponding microphone during the measurement session. As suggested by the link 522, in some instances block 520 may be repeated until all measurement sessions indicated by the orchestrating device are complete (e.g., according to a "stop" indication (for example, a stop packet) received from the orchestrating device, or after a predetermined duration of time). In some instances, block 520 may be repeated for each of a plurality of target audio devices.

Finally, block 525 involves ceasing to insert the gaps that were applied during the measurement session. In this example, after block 525 the process of FIG. 5B reverts back to block 510. In some such examples, the process will revert to block 510 a predetermined period of time after block 525 is performed. In some instances, the process may revert to block 510 in response to user input.

In some implementations, the frequency region, duration, and ordering of target devices in a set sequence may be determined by a simple algorithm based on unique device ID/names alone. For instance, the ordering of target devices may come in some agreed upon lexical/alphanumeric order, and the frequency and gap duration may be based on the present time of day, common to all devices. Such simplified embodiments have a lower system complexity but may not adapt with more dynamic needs of the system.

Example Measurements on Microphone Signals Revealed Through Gaps

Sub-band signals measured over the duration of an orchestrated gap measurement session correspond to the noise in the room, plus direct stimulus from the target device if one has been nominated. In this section we show examples of acoustic properties and related information that be determined from these sub-band signals, for further use in mapping, calibration, noise suppression and/or echo attenuation applications.

Ranging

According to some examples, sub-band signals measured during an orchestrated gap measurement session may be used to estimate the approximate distance between audio devices, e.g., based on an estimated direct-to-reverb ratio. For example, the approximate distance may be estimated based on a $1/r^2$ law if the target audio device can advertise an output sound pressure level (SPL), and if the speaker-to-microphone distance of the measuring audio device is known.

DoA

In some examples, sub-band signals measured during an orchestrated gap measurement session may be used to estimate the direction of arrival (DoA) and/or time or arrival (ToA) of sounds emitted by (e.g., speech of) one or more people and/or one or more audio devices in an audio environment. In some such examples, an acoustic zone corresponding with a current location of the one or more people and/or the one or more audio devices may be estimated. Some examples are described below with reference to FIG. 8A et seq.

Background Noise

According to some examples, background noise may be estimated according to sub-band signals measured during an orchestrated gap measurement session, even at times during which music or other audio data is being reproduced by loudspeakers in the audio environment. According to some such examples, background noise may be estimated by running a minimum follower (a filter that extracts the minimum value of a signal during a time window) over the energy found in each frame of data, e.g., according to the following expressions:

$$BackGroundNoise(k) = \min_{t=1 \ldots P} \left(m^2(t)\right)$$

$$BackGroundNoise \in \mathbb{R}^K$$

In the foregoing expressions, K represents the total number of frequency bins or frequency bands in the application and k represents the frequency bin or band being considered in the present measurement round. After enough measurement rounds, BackGroundNoise will contain an estimate for the full spectrum.

Reference Sharing

If all participating audio devices are listening and one audio device is playing during the measurement session, all the audio devices will receive a relatively clean recording of the playback content during the measurement session. As discussed in the prior headings, a number of acoustic properties may be derived from such microphone signals. A further class of acoustic properties may be derived if a "reference" signal for this playback signal is processed together with the microphone signals. The reference signal (which also may be referred to herein as "reference bins," indicating frequency bins corresponding to the reference signal) may, for example, be a copy of the audio information that was played by the target device over the course of the measurement session. The reference signal may, in some examples, be used by the target device for echo suppression.

In some examples the measurement session may be based on a narrow range of frequencies. Accordingly, less than the full bandwidth of reference information may be required to produce this class of acoustic properties. If less than the full bandwidth of reference information is required, this makes providing such reference data over a network connection more feasible to implement. For example, a typical frequency region with a bandwidth of 50 Hz corresponds to:

100%*(50/24000)*2~=0.5% of the original signal (assuming a sampling rate of 48 kHz and assuming that a representation of complex frequency bins is used). Furthermore, the same reference information may be presented to all other participating audio devices, further taking advantage of associated network efficiencies when broadcasting messages.

Non-Linearities

According to some examples that involve orchestrated gap measurement sessions for one or more target audio devices, the presence of non-linearities in played-back audio data may be detected. Some such examples may involve obtaining audibility estimates at a range of playback levels and determining whether or not the audibility estimates are linear.

Figure 6:
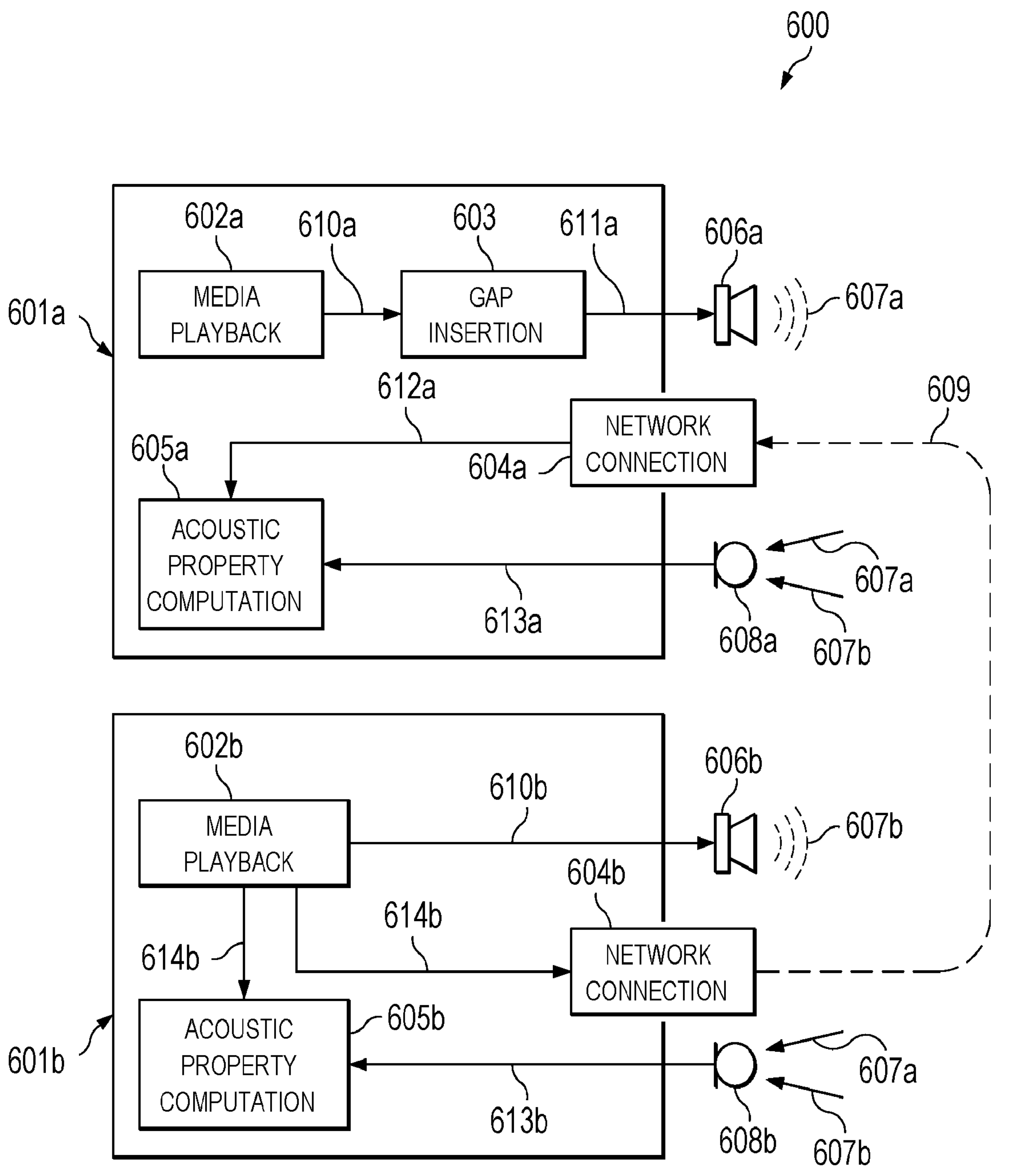
FIG. 6 shows an example of two orchestrated audio devices participating in a measurement session and sharing reference data.

FIG. 6 shows an example of two orchestrated audio devices participating in a measurement session and sharing reference data. As with other figures provided herein, the types and numbers of elements shown in FIG. 6 are merely provided by way of example. Other implementations may include more, fewer and/or different types and numbers of elements.

The figure numbers in FIG. 6 are postpended with "a" for audio device 601$a$ and "b" for audio device 601$b$. The elements of FIG. 6 include:

600: A system of two audio devices participating in a measurement session;

601$a$: An audio device participating in the measurement session, which is an instance of the apparatus 150 of FIG. 1C and which implements an instance of the control system 160 shown in FIG. 1C;

601*b*: Another audio device participating in the measurement session, which is another instance of the apparatus 150, which implements an instance of the control system 160 shown in FIG. 1C and which is a target device in this example;

602: Media playback engine producing audio content (e.g., music, a movie soundtrack or a podcast);

603: A gap insertion module;

604: A network connection module, which is configured to send and receive network packets over Wi-Fi, Bluetooth or another wireless protocol;

605: An acoustic property computation block, which is configured to accept microphone and reference signals, and to produce any of the acoustic properties described in this disclosure;

606*a*: One or more loudspeakers attached to audio device 601*a;*

606*b*: One or more loudspeakers attached to audio device 601*b;*

607*a*: The playback sound produced by loudspeaker 606*a*, corresponding to gap-inserted (modified) audio content;

607*b*: The playback sound produced by loudspeaker 606*b*, corresponding to unmodified (gap-free) audio content because audio device 601*b* is a target device in this example;

608*a*: One or more microphones attached to audio device 601*a*, detecting both 607*a* and 607*b;*

608*b*: One or more microphones attached to audio device 601*b*, detecting both 607*a* and 607*b;*

609: Network packets transmitted from audio device 601*b* to audio device 601*a*; containing at least the reference audio relevant for the present measurement session;

610: The media signal produced by media playback engine 602;

611: The media signal 610 with additional modifications imposed (one or more gaps);

612: The reference signal extracted from the network packets of 609, equivalent to 614;

613: The microphone signal corresponding to the measurement region for the current measurement session; and

614: The reference signal.

In FIG. 6, a measurement session is active. The audio device 601*b* is acting as a target device and is permitted to play media content in the measurement region(s) (the gap(s) inserted in the media content by audio device 601*a*) during the measurement session. Audio device 601*a* is also participating in the measurement session. In this example, the audio device 601*a* has been instructed by a control system of an orchestrating device to insert one or more suitable gaps (using gap insertion module 603) into the outgoing media signal 610*a*.

While playing back, in this example the audio device 601*b* extracts a reference signal 614*b* from the playback media 610*b*, corresponding to the same measurement region in frequency that is relevant to the present measurement session. The reference signal 614*b* may, for example, be inserted into network packets and sent over the local network (broadcast) as 609 to all the other participating audio devices. The reference signal 614*b* may be streamed progressively while the measurement session is active, or alternatively may be sent as one larger transmission when the measurement session is finished. The other participating audio devices receive this reference signal 614*b*, and also extract the corresponding microphone signal 613 with their microphones (608). The target device, audio device 601*b*, also records a microphone signal, and receives the reference signal, albeit skipping the network transmission of 609, as the information is present on the same device.

In the example shown in FIG. 6, the signals 613 and 612/614 are presented to the acoustic property block 605, which is configured to compute acoustic properties using both signals simultaneously. It should be noted that aspects of timing and synchronization may vary according the implementation details of specific embodiments, and that network packet timestamps as well as cross-correlation of reference and microphone signals may be used to align data appropriately for further analysis.

Audibility & Impulse Responses

According to some examples (e.g., in implementations such as that shown in FIG. 6), during a measurement session both a reference signal r and microphone signal in may be recorded and closely time-aligned over a period of P audio frames. We can denote:

$$r(t)\in\mathbb{C}^N, m(t)\in\mathbb{C}^n$$

In the foregoing expression, $\mathbb{C}^n$ represents a complex number space of dimension (size) n, r(t) and m(t) represent complex vectors of length n, and n represents the number of complex frequency bins used for the given measurement session. Accordingly, m(t) represents subband domain microphone signals. We can also denote:

$$t\in\mathbb{Z}, 1\leq t\leq P$$

In the foregoing expression, $\mathbb{Z}$ represents the set of all integer numbers and t represents any integer number in the range of 1-P, inclusively.

In this formulation, a classic channel identification problem may be solved, attempting to estimate a linear transfer function H that predicts the signal in from r. Existing solutions to this problem include adaptive finite impulse response (FIR) filters, offline (noncausal) Wiener filters, and many other statistical signal processing methods. The magnitude of the transfer function H may be termed audibility, a useful acoustic property that may in some applications be used to rank devices relevance to one another based on how “mutually-audible” they are. According to some examples, the magnitude of the transfer function H may be determined at a range of audio device playback levels in order to determine whether played-back audio data indicates audio device non-linearities, e.g., as described above.

Figure 7:
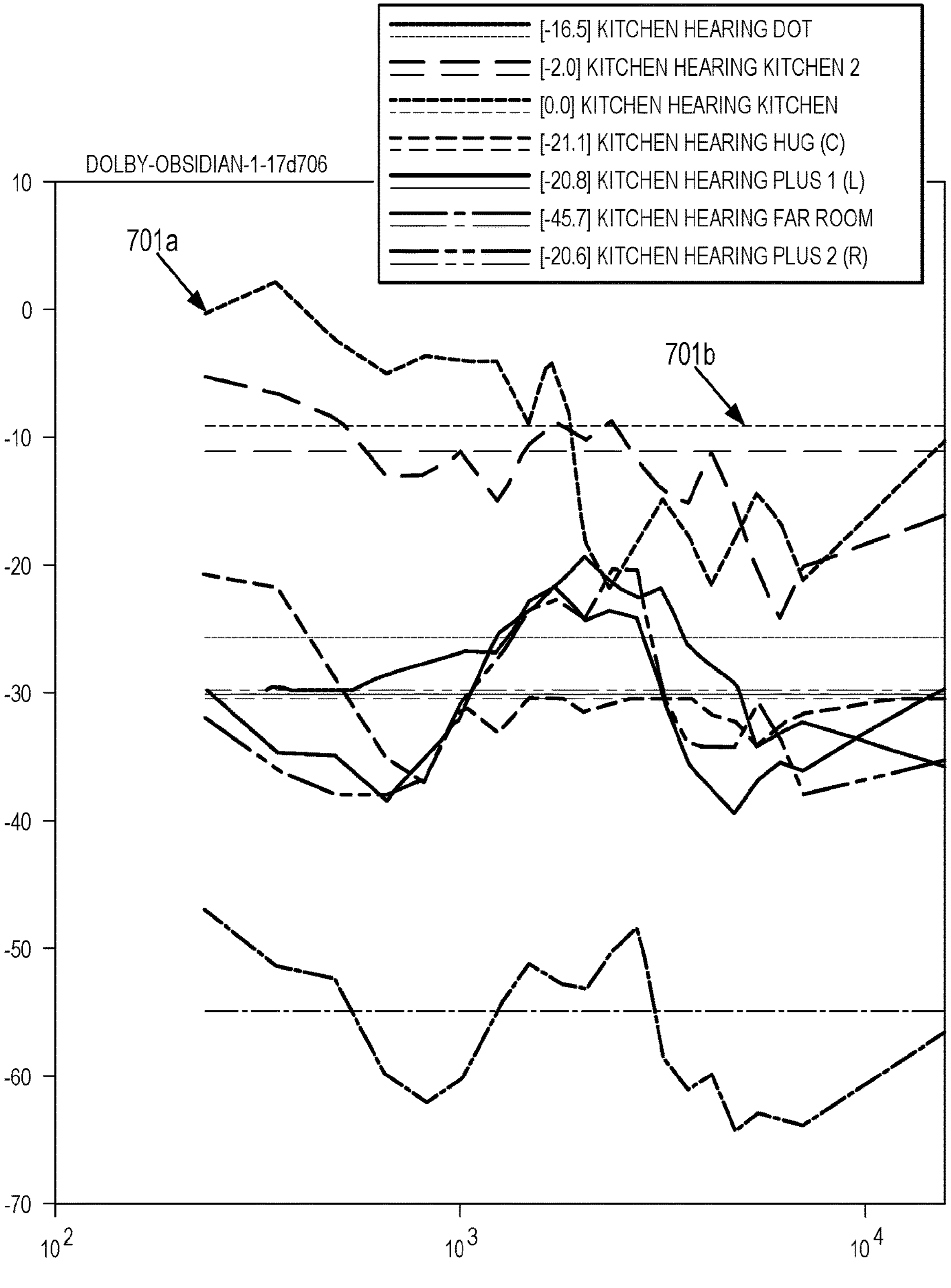
FIG. 7 shows examples of audibility graphs corresponding to audio devices in an audio environment.

FIG. 7 shows examples of audibility graphs corresponding to audio devices in an audio environment. In this instance, FIG. 7 depicts an experimental result of running a number of measurement sessions for a group of 7 audio devices positioned in various locations around a typical open-plan living environment. The horizontal axis shown in FIG. 7 represents frequency (Hz), and the vertical axis represents the total level of H in dB, which is also referred to as “audibility” in this disclosure. All acoustic measurements displayed (as aggregates) in FIG. 7 correspond to orchestrated measurement sessions when one particular audio device, named “DOLBY-OBSIDIAN/Kitchen”, was the target audio device. The audibility for each audio device is shown both as a bold dashed line, indicating audio device audibility as a function of frequency, and a dashed line having the same pattern but not represented in bold, indicating the mean audio device audibility level. From this figure, one can see a difference in overall audibility or level between the “Kitchen” audio device and various other audio devices. Furthermore, it may be observed in FIG. 7 that the audibility over frequency is different, revealing the level of detail that it was possible to achieve in the acoustic property measurements in this example. The lines representing "self-audibility", measuring the Kitchen audio device's own echo level, are lines 701*a* and 701*b*, which are suitably the loudest. The audio device closest to the "Kitchen," "Kitchen 2", is on average only 2 dB quieter, and occasionally measures louder than the "Kitchen" audio device for some audio frequencies. An audio device located in a distant room is measured to have very low audibility, on average 45 dB quieter than the self-audibility. The remainder of the audio devices that were located in the same room, at various positions, record audibility measures somewhere in-between.

An orchestrated system that includes multiple smart audio devices may be configured to determine when speech from a user is detected. For example, speech may be detected in a frequency band associated with an orchestrated gap whilst media content is being played, even if echo cancellation is not used or is not sufficient.

Figure 8A:
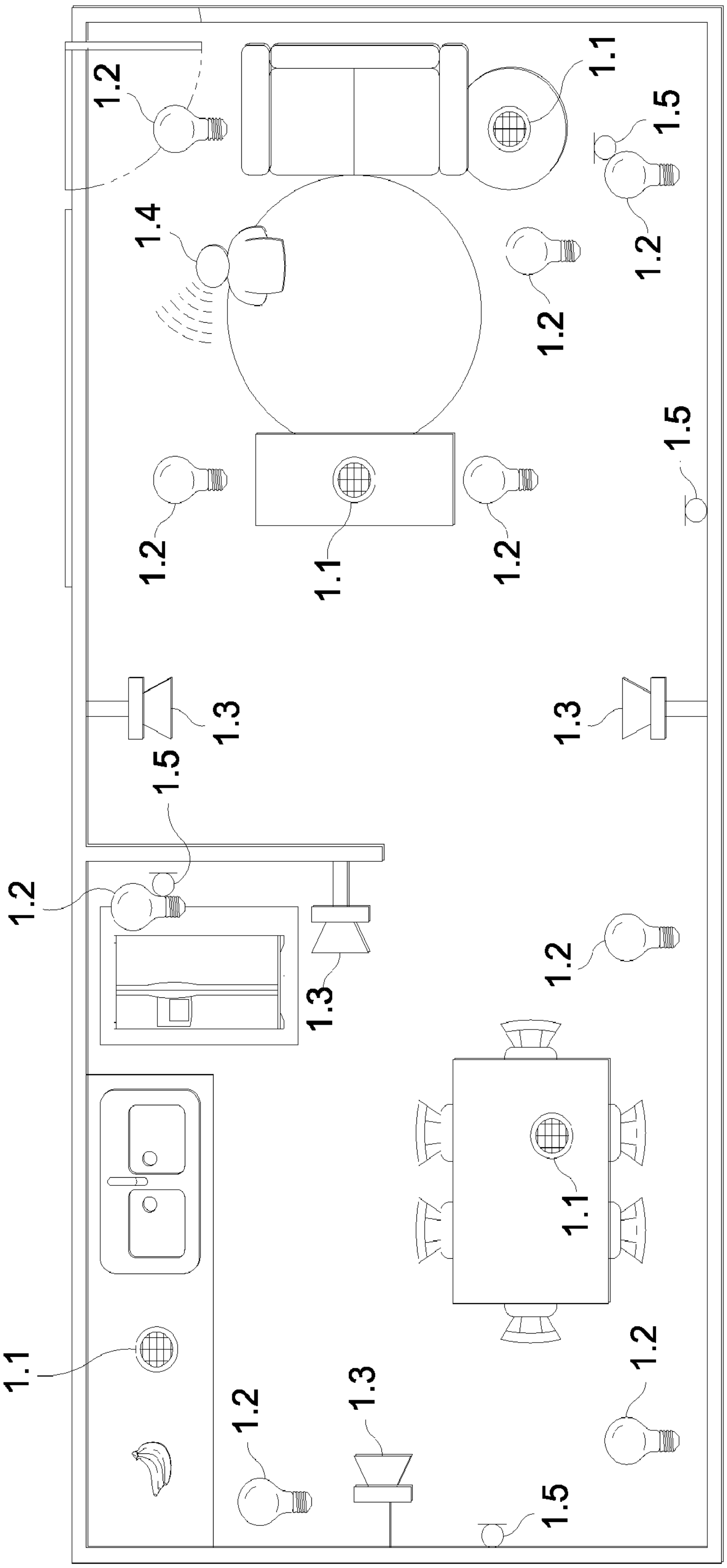
FIG. 8A shows another example of an audio environment.

FIG. 8A shows another example of an audio environment. FIG. 8A is a diagram of an audio environment (a living space, in this example) that includes a system including a set of smart audio devices (devices 1.1) for audio interaction, speakers (1.3) for audio output, microphones 1.5 and controllable lights (1.2). In some instances one or more of the microphones 1.5 may be part of, or associated with one of the devices 1.1, the lights 1.2 or the speakers 1.3. Alternatively, or additionally, one or more of the microphones 1.5 may be attached to another part of the environment, e.g., to a wall, to a ceiling, to furniture, to an appliance or to another device of the environment. In an example, each of the smart audio devices 1.1 includes (and/or is configured for communication with) at least one microphone 1.5. The system of FIG. 8A may be configured to implement one or more embodiments of the present disclosure. Using various methods, information may be obtained collectively from the microphones 1.5 of FIG. 8A and provided to a device (e.g., a classifier) configured to provide a positional estimate of a user who speaks.

In a living space (e.g., that of FIG. 8A), there are a set of natural activity zones where a person would be performing a task or activity, or crossing a threshold. These areas, which may be referred to herein as user zones, may be defined by a user, in some examples, without specifying coordinates or other indicia of a geometric location. In the example shown in FIG. 8A, user zones may include:

1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The TV couch (at the right of the open area);
6. The TV itself;
7. Tables; and
8. The door area or entry way (in the upper right region of the living space).

In accordance with some embodiments, a system that estimates where a sound (e.g., speech or noise) attributed to a user arises or originates may have some determined confidence in (or multiple hypotheses for) the estimate. For example, if a user happens to be near a boundary between zones of the system's environment, an uncertain estimate of location of the user may include a determined confidence that the user is in each of the zones.

Figure 8B:
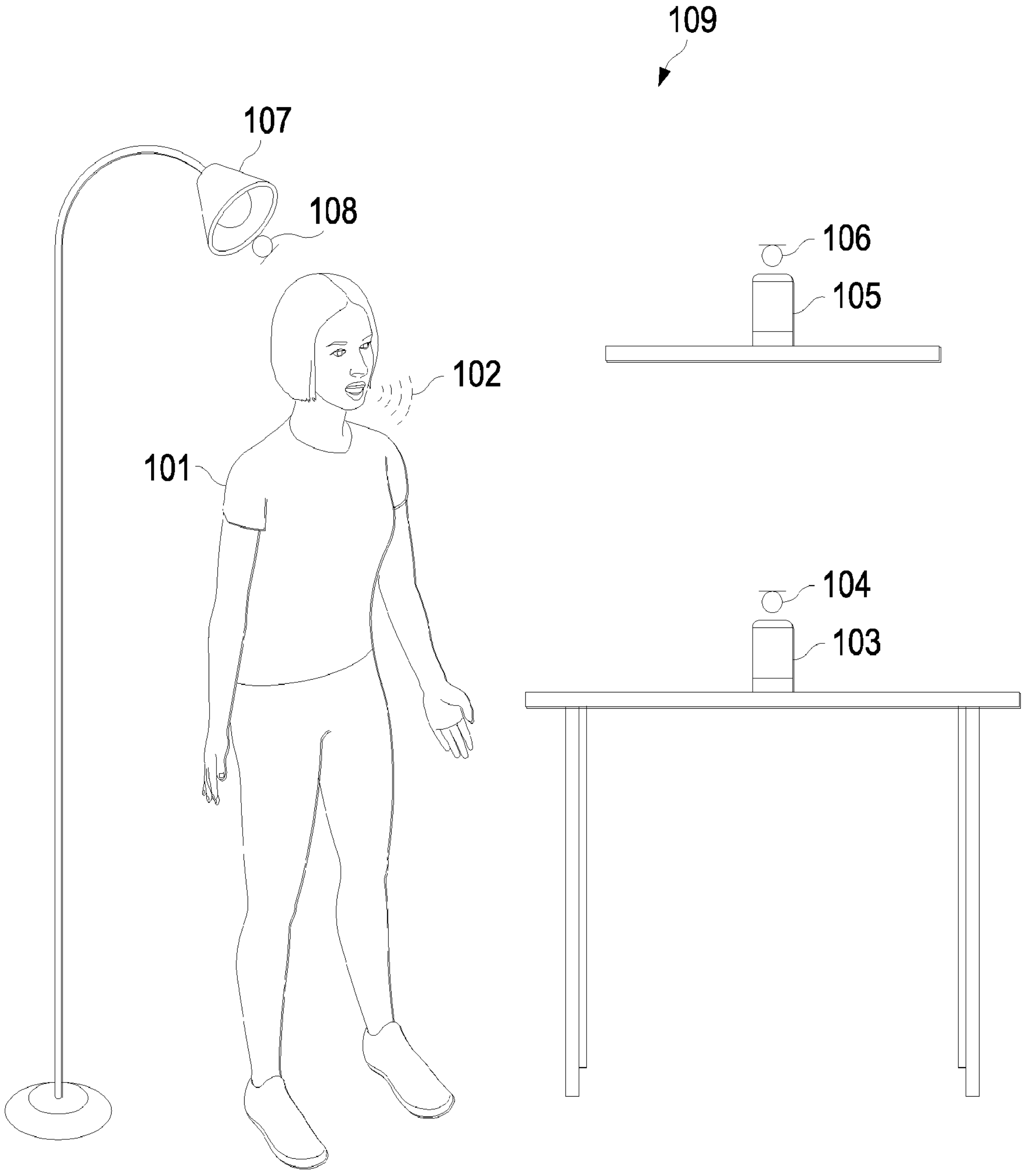
FIG. 8B shows another example of an audio environment.

FIG. 8B shows another example of an audio environment. In FIG. 8B, the environment 809 (an acoustic space) includes a user (801) who utters direct speech 802, and an example of a system including a set of smart audio devices (803 and 805), speakers for audio output, and microphones. The system may be configured in accordance with an embodiment of the present disclosure. The speech uttered by user 801 (sometimes referred to herein as a talker) may be recognized by element(s) of the system in the orchestrated time-frequency gaps.

More specifically, elements of the FIG. 8B system include:

- 802: direct local voice (produced by the user 801);
- 803: voice assistant device (coupled to one or more loudspeakers). Device 803 is positioned nearer to the user 801 than is device 805, and thus device 803 is sometimes referred to as a "near" device, and device 805 is referred to as a "distant" device;
- 804: plurality of microphones in (or coupled to) the near device 803;
- 805: voice assistant device (coupled to one or more loudspeakers);
- 806: plurality of microphones in (or coupled to) the distant device 805;
- 807: Household appliance (e.g. a lamp); and
- 808: Plurality of microphones in (or coupled to) household appliance 807. In some examples, each of the microphones 808 may be configured for communication with a device configured for implementing a classifier, which may in some instances be at least one of devices 803 or 805.

The FIG. 8B system may also include at least one classifier. For example, device 803 (or device 805) may include a classifier. Alternatively, or additionally, the classifier may be implemented by another device that may be configured for communication with devices 803 and/or 805. In some examples, a classifier may be implemented by another local device (e.g., a device within the environment 809), whereas in other examples a classifier may be implemented by a remote device that is located outside of the environment 809 (e.g., a server).

In some implementations, a control system (e.g., the control system 160 of FIG. 1C) may be configured for implementing a classifier, e.g., such as those disclosed herein. Alternatively, or additionally, the control system 160 may be configured for determining, based at least in part on output from the classifier, an estimate of a user zone in which a user is currently located.

Figure 8C:
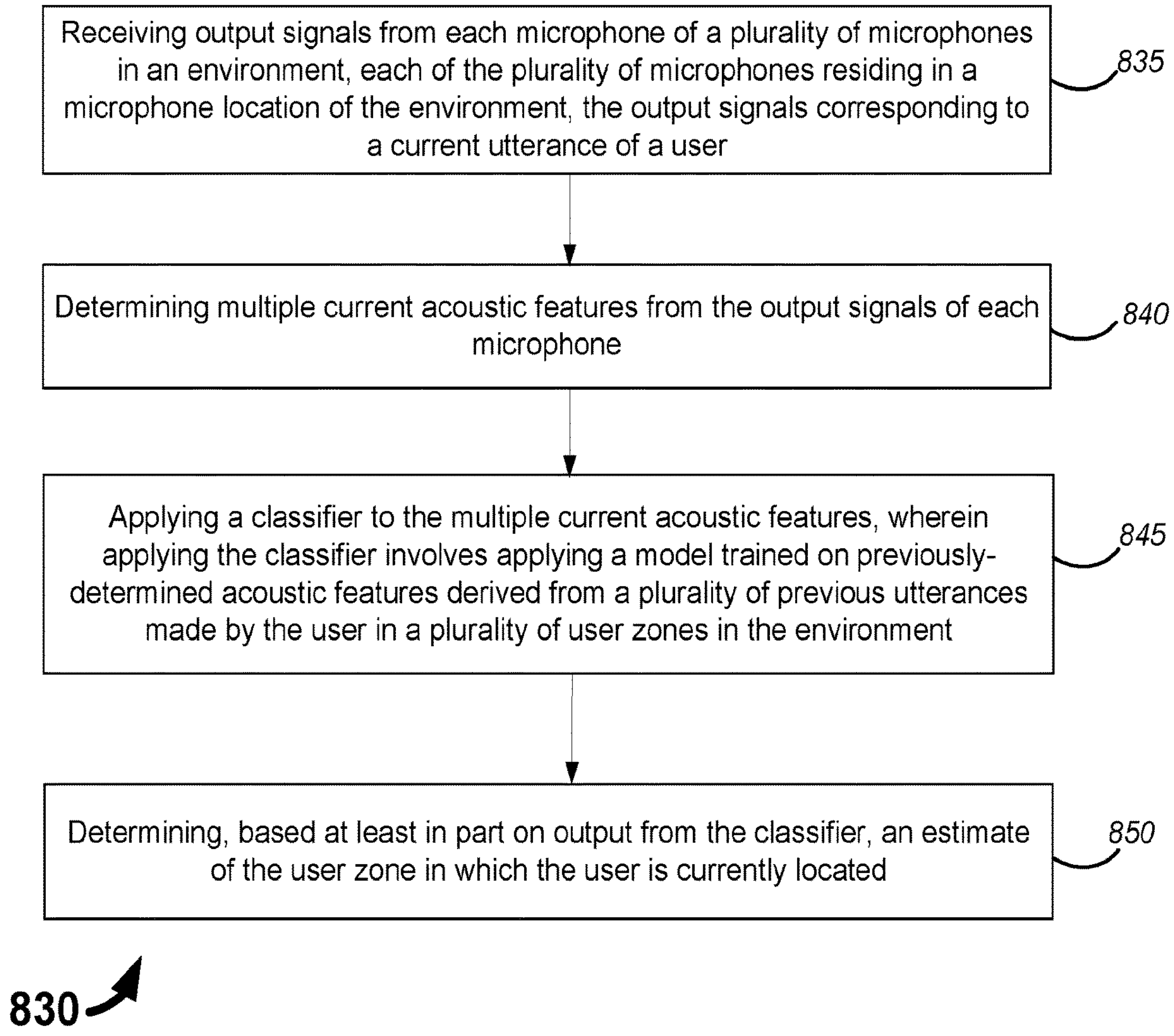
FIG. 8C is a flow diagram that outlines one example of a method that may be performed by an apparatus such as that shown in FIG. 1C.

FIG. 8C is a flow diagram that outlines one example of a method that may be performed by an apparatus such as that shown in FIG. 1C. The blocks of method 830, like other methods described herein, are not necessarily performed in the order indicated. Moreover, such methods may include more or fewer blocks than shown and/or described. In this implementation, method 830 involves estimating a user's location in an environment.

In this example, block 835 involves receiving output signals from each microphone of a plurality of microphones in the environment. In this instance, each of the plurality of microphones resides in a microphone location of the environment. According to this example, the output signals correspond to a current utterance of a user measured during orchestrated gaps in the playback content. Block 835 may, for example, involve a control system (such as the control system 160 of FIG. 1C) receiving output signals from each microphone of a plurality of microphones in the environment via an interface system (such as the interface system 155 of FIG. 1C).

In some examples, at least some of the microphones in the environment may provide output signals that are asynchronous with respect to the output signals provided by one or more other microphones. For example, a first microphone of the plurality of microphones may sample audio data according to a first sample clock and a second microphone of the plurality of microphones may sample audio data according to a second sample clock. In some instances, at least one of the microphones in the environment may be included, in or configured for communication with, a smart audio device.

According to this example, block 840 involves determining multiple current acoustic features from the output signals of each microphone. In this example, the "current acoustic features" are acoustic features derived from the "current utterance" of block 835. In some implementations, block 840 may involve receiving the multiple current acoustic features from one or more other devices. For example, block 840 may involve receiving at least some of the multiple current acoustic features from one or more speech detectors implemented by one or more other devices. Alternatively, or additionally, in some implementations block 840 may involve determining the multiple current acoustic features from the output signals.

Whether the acoustic features are determined by a single device or multiple devices, the acoustic features may be determined asynchronously. If the acoustic features are determined by multiple devices, the acoustic features would generally be determined asynchronously unless the devices were configured to coordinate the process of determining acoustic features. If the acoustic features are determined by a single device, in some implementations the acoustic features may nonetheless be determined asynchronously because the single device may receive the output signals of each microphone at different times. In some examples, the acoustic features may be determined asynchronously because at least some of the microphones in the environment may provide output signals that are asynchronous with respect to the output signals provided by one or more other microphones.

In some examples, the acoustic features may include a speech confidence metric, corresponding to speech measured during orchestrated gaps in the output playback signal.

Alternatively, or additionally, the acoustic features may include one or more of the following:

- Band powers in frequency bands weighted for human speech. For example, acoustic features may be based upon only a particular frequency band (for example, 400 Hz-1.5 kHz). Higher and lower frequencies may, in this example, be disregarded.
- Per-band or per-bin voice activity detector confidence in frequency bands or bins corresponding to gaps orchestrated in the playback content.
- Acoustic features may be based, at least in part, on a long-term noise estimate so as to ignore microphones that have a poor signal-to-noise ratio.
- Kurtosis as a measure of speech peakiness. Kurtosis can be an indicator of smearing by a long reverberation tail.

According to this example, block 845 involves applying a classifier to the multiple current acoustic features. In some such examples, applying the classifier may involve applying a model trained on previously-determined acoustic features derived from a plurality of previous utterances made by the user in a plurality of user zones in the environment. Various examples are provided herein.

In some examples, the user zones may include a sink area, a food preparation area, a refrigerator area, a dining area, a couch area, a television area, a bedroom area and/or a doorway area. According to some examples, one or more of the user zones may be a predetermined user zone. In some such examples, one or more predetermined user zones may have been selectable by a user during a training process.

In some implementations, applying the classifier may involve applying a Gaussian Mixture Model trained on the previous utterances. According to some such implementations, applying the classifier may involve applying a Gaussian Mixture Model trained on one or more of normalized speech confidence, normalized mean received level, or maximum received level of the previous utterances. However, in alternative implementations applying the classifier may be based on a different model, such as one of the other models disclosed herein. In some instances, the model may be trained using training data that is labelled with user zones. However, in some examples applying the classifier involves applying a model trained using unlabelled training data that is not labelled with user zones.

In some examples, the previous utterances may have been, or may have included, speech utterances. According to some such examples, the previous utterances and the current utterance may have been utterances of the same speech.

In this example, block 850 involves determining, based at least in part on output from the classifier, an estimate of the user zone in which the user is currently located. In some such examples, the estimate may be determined without reference to geometric locations of the plurality of microphones. For example, the estimate may be determined without reference to the coordinates of individual microphones. In some examples, the estimate may be determined without estimating a geometric location of the user. However, in alternative implementations, a location estimate may involve estimating a geometric location of one or more people and/or one or more audio devices in the audio environment, e.g., with reference to a coordinate system.

Some implementations of the method 830 may involve selecting at least one speaker according to the estimated user zone. Some such implementations may involve controlling at least one selected speaker to provide sound to the estimated user zone. Alternatively, or additionally, some implementations of the method 830 may involve selecting at least one microphone according to the estimated user zone. Some such implementations may involve providing signals output by at least one selected microphone to a smart audio device.

Figure 9:
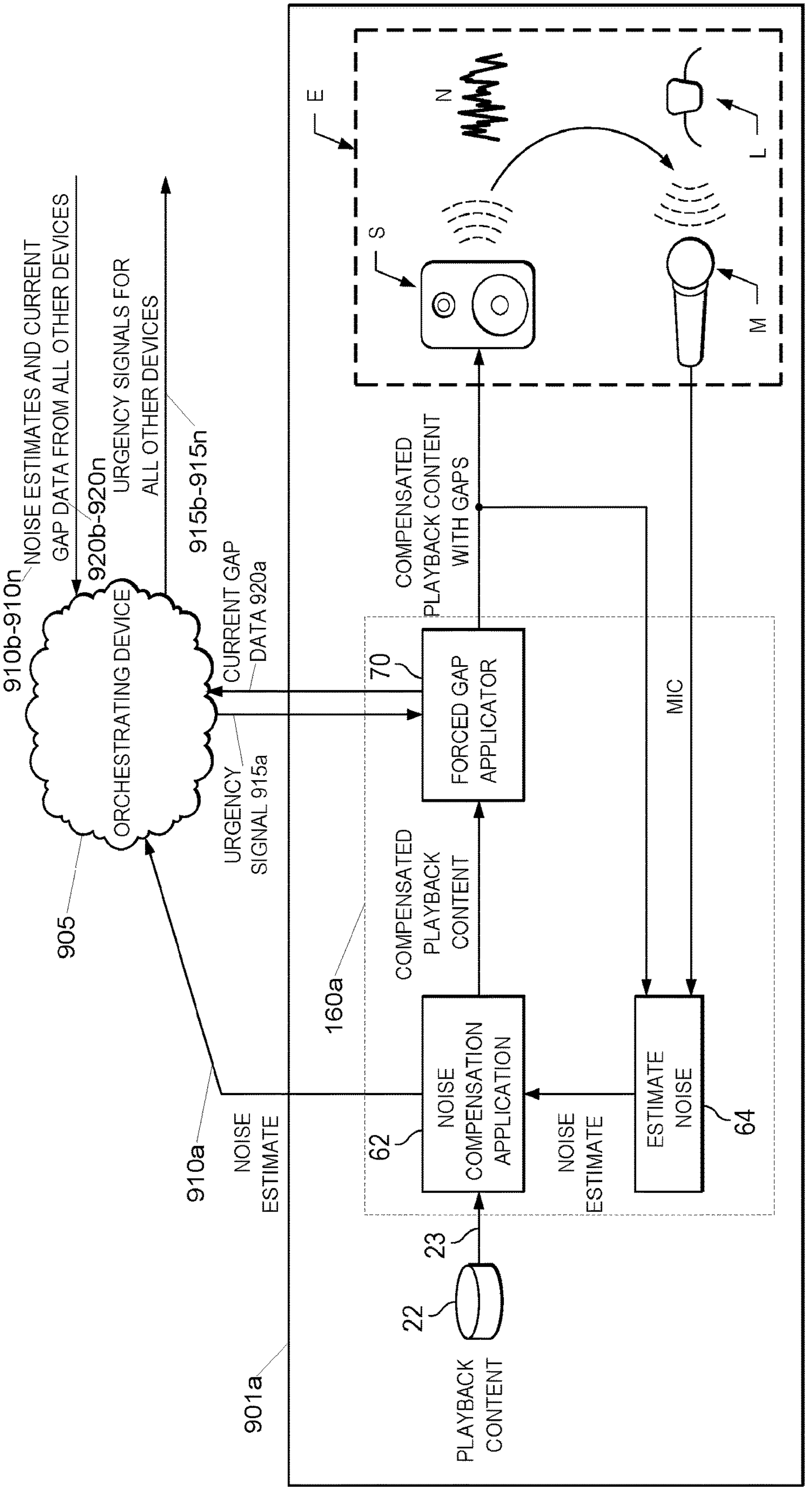
FIG. 9 presents a block diagram of one example of a system for orchestrated gap insertion.

FIG. 9 presents a block diagram of one example of a system for orchestrated gap insertion. The system of FIG. 9 includes an audio device 901*a*, which is an instance of the apparatus 150 of FIG. 1C and which includes a control system 160*a* that is configured to implement a noise estimation subsystem (noise estimator) 64, noise compensation gain application subsystem (noise compensation subsystem) 62, and forced gap application subsystem (forced gap applicator) 70. In this example, audio devices 901*b*-901*n* are also present in the playback environment E. In this implementation, each of the audio devices 901*b*-901*n* is an instance of the apparatus 150 of FIG. 1C and each includes a control system that is configured to implement an instance of the noise estimation subsystem 64, the noise compensation subsystem 62 and the forced gap application subsystem 70.

According to this example, the FIG. 9 system also includes an orchestrating device 905, which is also an instance of the apparatus 150 of FIG. 1C. In some examples, the orchestrating device 905 may be an audio device of the playback environment, such as a smart audio device. In some such examples, the orchestrating device 905 may be implemented via one of the audio devices 901*a*-901*n*. In other examples, the orchestrating device 905 may be another type of device, such as what is referred to herein as a smart home hub. According to this example, the orchestrating device 905 includes a control system that is configured to receive noise estimates 910*a*-910*n* from the audio devices 901*a*-901*n* and to provide urgency signals, 915*a*-915*n* to the audio devices 901*a*-901*n* for controlling each respective instance of the forced gap applicator 70. In this implementation, each instance of the forced gap applicator 70 is configured to determine whether to insert a gap, and if so what type of gap to insert, based on the urgency signals 915*a*-915*n*.

According to this example, the audio devices 901*a*-901*n* are also configured to provide current gap data 920*a*-920*n* to the orchestrating device 905, indicating what gap, if any, each of the audio devices 901*a*-901*n* is implementing. In some examples, the current gap data 920*a*-920*n* may indicate a sequence of gaps that an audio device is in the process of applying and corresponding times (e.g., a starting time and a time interval for each gaps or all gaps). In some implementations, the control system of the orchestrating device 905 may be configured to maintain a data structure indicating, e.g., recent gap data, which audio devices have received recent urgency signals, etc. In the FIG. 9 system, each instance of the forced gap application subsystem 70 operates in response to urgency signals 915*a*-915*n*, so that the orchestrating device 905 has control over forced gap insertion based on the need for gaps in the playback signal.

According to some examples, the urgency signals 915*a*-915*n* may indicate a sequence of urgency value sets [$U_0$, $U_1$, . . . $U_N$], where N is a predetermined number of frequency bands (of the full frequency range of the playback signal) in which subsystem 70 may insert forced gaps (e.g., with one forced gap inserted in each of the bands), and $U_t$ is an urgency value for the "i"th band in which subsystem 70 may insert a forced gap. The urgency values of each urgency value set (corresponding to a time) may be generated in accordance with any disclosed embodiment for determining urgency, and may indicate the urgency for insertion (by subsystem 70) of forced gaps (at the time) in the N bands.

In some implementations, the urgency signals 915*a*-915*n* may indicate a fixed (time invariant) urgency value set [$U_0$, $U_1$, . . . $U_N$] determined by a probability distribution defining a probability of gap insertion for each of the N frequency bands. According to some examples, the probability distribution is implemented with a pseudo-random mechanism so that the outcome (the response of each instance of subsystem 70) is deterministic (the same) across all of the recipient audio devices 901*a*-901*n*. Thus, in response to such a fixed urgency value set, subsystem 70 may be configured to insert fewer forced gaps (on the average) in those bands which have lower urgency values (i.e., lower probability values determined by the pseudo-random probability distribution), and to insert more forced gaps (on the average) in those bands which have higher urgency values (i.e., higher probability values). In some implementations, urgency signals 915*a*-915*n* may indicate a sequence of urgency value sets [$U_0$, $U_1$, . . . $U_N$], e.g., a different urgency value set for each different time in the sequence. Each such different urgency value set may be determined by a different pseudo-random probability distribution for each of the different times.

We next describe methods (which may be implemented in any of many different embodiments of the disclosed pervasive listening method) for determining urgency values or a signal (U) indicative of urgency values.

An urgency value for a frequency band indicates the need for a gap to be forced in the band. We present three strategies for determining urgency values, $U_k$, where $U_k$ denotes urgency for forced gap insertion in band k, and U denotes a vector containing the urgency values for all bands of a set of $B_{count}$ frequency bands:

$$U=[U_0, U_1, U_2, \ldots].$$

The first strategy (sometimes referred to herein as Method 1) determines fixed urgency values. This method is the simplest, simply allowing the urgency vector U to be a predetermined, fixed quantity. When used with a fixed perceptual freedom metric, this can be used to implement a system that randomly inserts forced gaps over time. Some such methods do not require time-dependent urgency values supplied by a pervasive listening application. Thus:

$$U=[u_0, u_1, u_2, \ldots u_X]$$

where $X=B_{count}$, and each value $u_k$ (for k in the range from k=1 to $k=B_{count}$) represents a predetermined, fixed urgency value for the "k" band. Setting all $u_k$ to 1.0 would express an equal degree of urgency in all frequency bands.

The second strategy (sometimes referred to herein as Method 2) determines urgency values which depend on elapsed time since occurrence of a previous gap. In some implementations, urgency gradually increases over time, and returns to a low value once either a forced or existing gap causes an update in a pervasive listening result (e.g., a background noise estimate update).

Thus, the urgency value $U_k$ in each frequency band (band k) may correspond with a duration of time (e.g., the number of seconds) since a gap was perceived (by a pervasive listener) in band k. In some examples, the urgency value $U_k$ in each frequency band may be determined as follows:

$$U_k(t)=\min(t-t_g, U_{max})$$

where $t_g$ represents the time at which the last gap was seen for band k, and $U_{max}$ represents a tuning parameter which limits urgency to a maximum size. It should be noted that $t_g$ may update based on the presence of gaps originally present in the playback content. For example, in noise compensation, the current noise conditions in the playback environment may determine what is considered a gap in the output playback signal. That is, the playback signal must be quieter when the environment is quiet for a gap to occur, than in the case that the environment is noisier. Likewise, the urgency for frequency bands typically occupied by human speech will typically be of more importance when implementing a pervasive listening method which depends on occurrence or non-occurrence of speech utterances by a user in the playback environment.

The third strategy (sometimes referred to herein as Method 3) determines urgency values which are event based. In this context, "event based" denotes dependent on some event or activity (or need for information) external to the playback environment, or detected or inferred to have occurred in the playback environment. Urgency determined by a pervasive listening subsystem may vary suddenly with the onset of new user behavior or changes in playback environment conditions. For example, such a change may cause one or more devices configured for pervasive listening to have an urgent need to observe background activity in order to make a decision, or to rapidly tailor the playback experience to new conditions, or to implement a change in the general urgency or desired density and time between gaps in each band. Table 3 below provides a number of examples of contexts and scenarios and corresponding event-based changes in urgency:

TABLE 3

| CONTEXT | Conditions | Change in Urgency | Examples |
|---|---|---|---|
| User Interface | Some played out audio or other modality has requested verbal or auditory response from the user, without pausing or ducking the played out audio | Increase | Incoming message tone waiting for user to "answer" the question "Is this the song you wanted?" by uttering a response |
| Environment Scanning | Occasional deeper probe of background noise and what may be going on in the playback environment | Increase | When the pervasive listener has not detected any user speech or button presses for a while, it may listen closely to see if the user is still present. |
| Request or Metadata Indicating Quality is a Priority | Something from the user, or data available to the pervasive listener, suggests that playback audio should not have forced gaps inserted therein | Decrease | "Dolby" signature voice user says "Play this bit loud and clear" |
| Predictive Behaviour | Points of content that either heuristically or from population data line up with the times that users want to talk or be heard. | Increase or Decrease | 5 s into playback of a new track, expect a "skip" or "turn it up" utterance, or in response to occurrence of offensive language in content look for a parent uttering "stop" |

A fourth strategy (sometimes referred to herein as Method 4) determines urgency values using a combination of two or more of Methods 1, 2, and 3. For example, each of Methods 1, 2, and 3 may be combined into a joint strategy, represented by a generic formulation of the following type:

$$U_k(t)=u_k*\min(t-t_g, U_{max})*V_k$$

where $U_k$ represents a fixed unitless weighting factor that controls the relative importance of each frequency band, $V_k$ represents a scalar value that is modulated in response to changes in context or user behaviour that require a rapid alteration of urgency, and $t_g$ and $U_{max}$ are defined above. In some examples, the values $V_k$ are expected to remain at a value of 1.0 under normal operation.

In some examples of a multiple-device context, the forced gap applicators of the smart audio devices of an audio environment may co-operate in an orchestrated manner to achieve an accurate estimation of the environmental noise N. In some such implementations, the determination of where forced gaps are introduced in time and frequency may be made by an orchestrating device 905 implemented by a separate orchestrating device (such as what is referred to elsewhere herein as a smart home hub). In some alternative implementations, the determination of where forced gaps are introduced in time and frequency may be made by one of the smart audio devices acting as a leader (e.g., a smart audio device acting as an orchestrating device 905).

In some implementations, the orchestrating device 905 may include a control system that is configured to receive the noise estimates 910*a*-910*n* and to provide gap commands to the audio devices 901*a*-901*n* which may be based, at least in part, on the noise estimates 910*a*-910*n*. In some such examples, the orchestrating device 905 may provide the gap commands instead of urgency signals. According to some such implementations, the forced gap applicator 70 does not need to determine whether to insert a gap, and if so what type of gap to insert, based on urgency signals, but may instead simply act in accordance with the gap commands.

In some such implementations, the gap commands may indicate the characteristics (e.g., frequency range or $B_{count}$, Z, t1, t2 and/or t3) of one or more specific gaps to be inserted and the time(s) for insertion of the one or more specific gaps. For example, the gap commands may indicate a sequence of gaps and corresponding time intervals such as one of those shown in FIGS. 3B-3J and described above. In some examples, the gap commands may indicate a data structure from which a receiving audio device may access characteristics of a sequence of gaps to be inserted and corresponding time intervals. The data structure may, for example, have been previously provided to the receiving audio device. In some such examples, the orchestrating device 905 may include a control system that is configured to make urgency calculations for determining when to send the gaps commands and what type of gap commands to send.

According to some examples, an urgency signal may be estimated, at least in part, by the noise estimation element 64 of one or more of the audio devices 901*a*-901*n* and may be transmitted to the orchestrating device 905. The decision to orchestrate a forced gap in a particular frequency region and place in time may, in some examples, be determined at least in part by an aggregate of these urgency signals from one or more of the audio devices 901*a*-901*n*. For example, the disclosed algorithms that make a choice informed by urgency may instead use the maximum urgency as computed across the urgency signal of multiple audio devices, e.g., Urgency=maximum(UrgencyA, UrgencyB, UrgencyC, . . . ) where UrgencyA/B/C are understood as the urgency signals of three separate example devices implementing noise compensation.

Noise compensation systems (e.g., that of FIG. 9) can function with weak or non-existent echo cancellation (e.g., when implemented as described in US Provisional Patent Application No. 62/663,302, which is hereby incorporated by reference), but may suffer from content-dependent response times especially in the case of music, TV, and movie content. The time taken by a noise compensation system to respond to changes in the profile of background noise in the playback environment can be very important to the user experience, sometimes more so than the accuracy of the actual noise estimate. When the playback content provides few or no gaps in which to glimpse the background noise, the noise estimates may remain fixed even when noise conditions change. While interpolating and imputing missing values in a noise estimate spectrum is typically helpful, it is still possible for large regions of the noise estimate spectrum to become locked up and stale.

Some embodiments of the FIG. 9 system may be operable to provide forced gaps (in the playback signal) which occur sufficiently often (e.g., in each frequency band of interest of the output of forced gap applicator 70) that background noise estimates (by noise estimator 64) can be updated sufficiently often to respond to typical changes in profile of background noise N in playback environment E. In some examples, subsystem 70 may be configured to introduce forced gaps in the compensated audio playback signal (having K channels, where K is a positive integer) which is output from noise compensation subsystem 62. Here, noise estimator 64 may be configured to search for gaps (including forced gaps inserted by subsystem 70) in each channel of the compensated audio playback signal, and to generate noise estimates for the frequency bands (and in the time intervals) in which the gaps occur. In this example, the noise estimator 64 of audio device 901*a* is configured to provide a noise estimate 910*a* to the noise compensation subsystem 62. According to some examples, the noise estimator 64 of audio device 901*a* may also be configured to use the resulting information regarding detected gaps to generate (and provide to the orchestrating device 905) an estimated urgency signal, whose urgency values track the urgency for inserting forced gaps in frequency bands of the compensated audio playback signal.

In this example, the noise estimator 64 is configured to accept both microphone feed Mic (the output of microphone M in playback environment E) and a reference of the compensated audio playback signal (the input to speaker system S in playback environment E). According to this example, the noise estimates generated in subsystem 64 are provided to noise compensation subsystem 62, which applies compensation gains to input playback signal 23 (from content source 22) to level each frequency band thereof to the desired playback level. In this example, the noise compensated audio playback signal (output from subsystem 62) and an urgency metric per band (indicated by the urgency signal output from the orchestrating device 905) are provided to forced gap applicator 70, which forces gaps in the compensated playback signal (preferably in accordance with an optimization process). Speaker feed(s), each indicative of the content of a different channel of the noise compensated playback signal (output from forced gap applicator 70), are (is) provided to each speaker of speaker system S.

Although some implementations of the FIG. 9 system may perform echo cancellation as an element of the noise estimation that it performs, other implementations of the FIG. 9 system do not perform echo cancellation. Accordingly, elements for implementing echo cancellation are not specifically shown in FIG. 9.

In FIG. 9, the time domain-to-frequency domain (and/or frequency domain-to-time domain) transformations of signals are not shown, but the application of noise compensation gains (in subsystem 62), analysis of content for gap forcing (in orchestrating device 905, noise estimator 64 and/or forced gap applicator 70) and insertion of forced gaps (by forced gap applicator 70) may be implemented in the same transform domain for convenience, with the resulting output audio resynthesised to PCM (time-domain) audio before playback or further encoding for transmission. According to some examples, each participating device co-ordinates the forcing of such gaps using methods described elsewhere herein. In some such examples, the gaps introduced may be identical. In some examples the gaps introduced may be synchronized.

By use of forced gap applicator 70, present on each participating device, inserting gaps, the number of gaps in each channel of the compensated playback signal (output from noise compensation subsystem 62 of the FIG. 9 system) may be increased (relative to the number of gaps which would occur without use of forced gap applicator 70), so as to significantly reduce the requirements on any echo canceller implemented by the FIG. 9 system, and in some cases even to eliminate the need for echo cancellation entirely.

In some disclosed implementations, it is possible for simple post-processing circuitry such as time-domain peak limiting or speaker protection to be implemented between the forced gap applicator 70 and speaker system S. However post-processing with the ability to boost and compress the speaker feeds has the potential to undo or lower the quality of the forced gaps inserted by the forced gap applicator, and thus these types of post-processing are preferably implemented at a point in the signal processing path before forced gap applicator 70.

Figure 10:
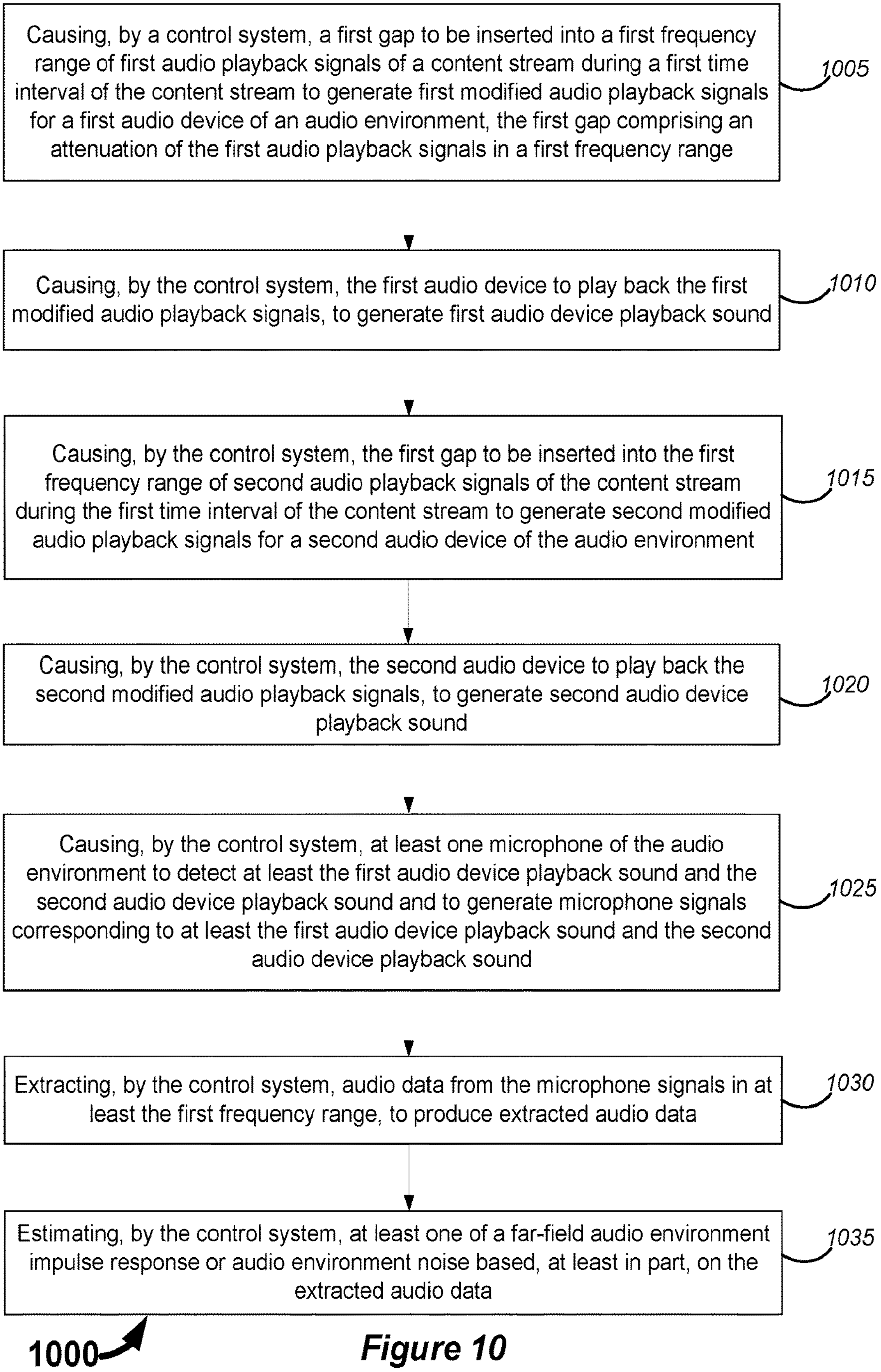
FIG. 10 is a flow diagram that outlines another example of a disclosed method.

FIG. 10 is a flow diagram that outlines another example of a disclosed method. The blocks of method 1000, like other methods described herein, are not necessarily performed in the order indicated. Moreover, such methods may include more or fewer blocks than shown and/or described. In this example, method 1000 is an audio processing method.

The method 1000 may be performed by an apparatus or system, such as the apparatus 150 that is shown in FIG. 1C and described above. In some examples, the blocks of method 1000 may be performed by one or more devices within an audio environment, e.g., by an orchestrating device such as an audio system controller (e.g., what is referred to herein as a smart home hub) or by another component of an audio system, such as a smart speaker, a television, a television control module, a laptop computer, a mobile device (such as a cellular telephone), etc. In some implementations, the audio environment may include one or more rooms of a home environment. In other examples, the audio environment may be another type of environment, such as an office environment, an automobile environment, a train environment, a street or sidewalk environment, a park environment, etc. However, in alternative implementations at least some blocks of the method 1000 may be performed by a device that implements a cloud-based service, such as a server.

In this implementation, block 1005 involves causing, by a control system, a first gap to be inserted into a first frequency range of first audio playback signals of a content stream during a first time interval of the content stream, to generate first modified audio playback signals for a first audio device of an audio environment. In this example, the first gap corresponds with an attenuation of the first audio playback signals in the first frequency range. In this example, block 1010 involves causing, by the control system, the first audio device to play back the first modified audio playback signals, to generate first audio device playback sound.

In this example, block 1015 involves causing, by the control system, the first gap to be inserted into the first frequency range of second audio playback signals of the content stream during the first time interval of the content stream, to generate second modified audio playback signals for a second audio device of the audio environment. According to this example, block 1020 involves causing, by the control system, the second audio device to play back the second modified audio playback signals, to generate second audio device playback sound.

According to this implementation, block 1025 involves causing, by the control system, at least one microphone of the audio environment to detect at least the first audio device playback sound and the second audio device playback sound and to generate microphone signals corresponding to at least the first audio device playback sound and the second audio device playback sound. In this example, block 1030 involves extracting, by the control system, audio data from the microphone signals in at least the first frequency range, to produce extracted audio data. According to this implementation, block 1035 involves estimating, by the control system, at least one of a far-field audio environment impulse response or audio environment noise based, at least in part, on the extracted audio data.

In some implementations, method 1000 may involve causing a target audio device to play back unmodified audio playback signals of the content stream, to generate target audio device playback sound. Some such implementations may involve estimating, by the control system, at least one of a target audio device audibility or a target audio device position based, at least in part, on the extracted audio data. In some such examples, the unmodified audio playback signals do not include the first gap. In some instances, the unmodified audio playback signals do not include a gap inserted into any frequency range. In some such examples, the microphone signals also correspond to the target audio device playback sound.

According to some implementations, generating the first modified audio playback signals may involve causing, by the control system, second through $N^{th}$ gaps to be inserted into second through $N^{th}$ frequency ranges of the first audio playback signals during second through $N^{th}$ time intervals of the content stream. In some such examples, generating the second modified audio playback signals may involve causing, by the control system, the second through $N^{th}$ gaps to be inserted into the second through $N^{th}$ frequency ranges of the second audio playback signals during the second through $N^{th}$ time intervals of the content stream. According to some examples, at least the first gap (in in some instances all gaps) may be perceptually masked.

In some implementations, method 1000 may involve causing, by the control system, the first gap to be inserted into the first frequency range of third through $M^{th}$ audio playback signals of the content stream during the first time interval of the content stream, to generate third through $M^{th}$ modified audio playback signals for third through $M^{th}$ audio devices of the audio environment. Some such examples may involve causing, by the control system, the third through $M^{th}$ audio devices to play back corresponding instances of third through $M^{th}$ modified audio playback signals, to generate third through $M^{th}$ audio device playback sound, wherein generating the microphone signals involves causing, by the control system, the at least one microphone of the audio environment to detect the third through $M^{th}$ audio device playback sound. In some such examples, generating first through $M^{th}$ modified audio playback signals involves causing, by the control system, second through $M^{th}$ gaps to be inserted into second through $N^{th}$ frequency ranges of the first through $M^{th}$ audio playback signals during second through $N^{th}$ time intervals of the content stream.

In some examples, at least the first frequency range may correspond to a frequency band. In some such examples, the frequency band may be one of a plurality of frequency bands that are equally spaced on a mel scale. However, in some instances at least the first frequency range may correspond to a frequency bin.

In some implementations, method 1000 may involve causing reference bins to be sent from a first device to a second device. The first device may, in some examples, be a target device. The reference bins may, for example, correspond to output of the target device in the first frequency range.

According to some examples, causing the first gap to be inserted may involve transmitting instructions to insert the first gap. In some alternative implementations, causing the first gap to be inserted may involve inserting the first gap.

In some implementations, causing the first audio device to play back the first modified audio playback signals may involve transmitting instructions to the first audio device to play back the first modified audio playback signals. According to some examples, the first modified audio playback signals and the second modified audio playback signals may be at least partially correlated.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system may be implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. An audio processing method, comprising:

causing, by a control system, a first gap to be inserted into a first frequency range of first audio playback signals of a content stream during a first time interval of the content stream to generate first modified audio playback signals for a first audio device of an audio environment, the first gap comprising an attenuation of the first audio playback signals in the first frequency range;

causing, by the control system, the first audio device to play back the first modified audio playback signals, to generate first audio device playback sound;

causing, by the control system, the first gap to be inserted into the first frequency range of second audio playback signals of the content stream during the first time interval of the content stream to generate second modified audio playback signals for a second audio device of the audio environment;

causing, by the control system, the second audio device to play back the second modified audio playback signals, to generate second audio device playback sound;

causing, by the control system, at least one microphone of the audio environment to detect at least the first audio device playback sound and the second audio device playback sound and to generate microphone signals corresponding to at least the first audio device playback sound and the second audio device playback sound;

extracting, by the control system, audio data from the microphone signals in at least the first frequency range, to produce extracted audio data; and estimating, by the control system, a far-field audio environment impulse response based, at least in part, on the extracted audio data.

2. The audio processing method of claim 1, further comprising:

causing a target audio device to play back unmodified audio playback signals of the content stream, to generate target audio device playback sound; and estimating, by the control system, at least one of a target audio device audibility or a target audio device position based, at least in part, on the extracted audio data, wherein:

the unmodified audio playback signals do not include the first gap; and the microphone signals also correspond to the target audio device playback sound.

3. The audio processing method of claim 2, wherein the unmodified audio playback signals do not include a gap inserted into any frequency range.

4. The audio processing method of claim 1, wherein:

generating the first modified audio playback signals involves causing, by the control system, second through $N^{th}$ gaps to be inserted into second through $N^{th}$ frequency ranges of the first audio playback signals during second through $N^{th}$ time intervals of the content stream; and generating the second modified audio playback signals involves causing, by the control system, the second through $N^{th}$ gaps to be inserted into the second through $N^{th}$ frequency ranges of the second audio playback signals during the second through $N^{th}$ time intervals of the content stream.

5. The audio processing method of claim 1, further comprising:

causing, by the control system, the first gap to be inserted into the first frequency range of third through $M^{th}$ audio playback signals of the content stream during the first time interval of the content stream to generate third through $M^{th}$ modified audio playback signals for third through $M^{th}$ audio devices of the audio environment; and causing, by the control system, the third through $M^{th}$ audio devices to play back corresponding instances of third through $M^{th}$ modified audio playback signals, to generate third through $M^{th}$ audio device playback sound, wherein generating the microphone signals involves causing, by the control system, the at least one microphone of the audio environment to detect the third through $M^{th}$ audio device playback sound.

6. The audio processing method of claim 5, wherein generating first through $M^{th}$ modified audio playback signals involves causing, by the control system, second through $N^{th}$ gaps to be inserted into second through $N^{th}$ frequency ranges of the first through $M^{th}$ audio playback signals during second through $N^{th}$ time intervals of the content stream.

7. The audio processing method of claim 1, wherein at least the first gap is perceptually masked.

8. The audio processing method of claim 1, wherein at least the first frequency range corresponds to a frequency band.

9. The audio processing method of claim 8, wherein the frequency band is one of a plurality of frequency bands that are equally spaced on a mel scale.

10. The audio processing method of claim 1, wherein at least the first frequency range corresponds to a frequency bin.

11. The audio processing method of claim 2, further comprising causing reference bins to be sent from a first device to a second device, the reference bins corresponding to output of the target audio device in the first frequency range.

12. The audio processing method of claim 1, wherein causing the first gap to be inserted comprises inserting the first gap or transmitting instructions to insert the first gap.

13. The audio processing method of claim 1, wherein causing the first audio device to play back the first modified audio playback signals comprises transmitting instructions to the first audio device to play back the first modified audio playback signals.

14. The audio processing method of claim 1, wherein the first modified audio playback signals and the second modified audio playback signals are at least partially correlated.

15. An apparatus configured to perform the audio processing method of claim 1.

16. A system configured to perform the audio processing method of claim 1.

17. One or more non-transitory media having software stored thereon, the software including instructions for controlling one or more devices to perform the audio processing method of claim 1.

* * * * *